US012405249B2

(12) United States Patent
Gysling

(10) Patent No.: US 12,405,249 B2
(45) Date of Patent: Sep. 2, 2025

(54) SYSTEMS AND METHODS FOR MONITORING HYDRAULIC SYSTEMS

(71) Applicant: Corvera, LLC, South Glastonbury, CT (US)

(72) Inventor: Daniel Gysling, South Glastonbury, CT (US)

(73) Assignee: CorVera LLC, South Glastonbury, CT (US)

( * ) Notice: Subject to any disclaimer, the term of this patent is extended or adjusted under 35 U.S.C. 154(b) by 0 days.

(21) Appl. No.: 19/112,397

(22) PCT Filed: Mar. 4, 2024

(86) PCT No.: PCT/US2024/018340
§ 371 (c)(1),
(2) Date: Mar. 17, 2025

(87) PCT Pub. No.: WO2024/182798
PCT Pub. Date: Sep. 6, 2024

(65) Prior Publication Data
US 2025/0258136 A1    Aug. 14, 2025

Related U.S. Application Data

(60) Provisional application No. 63/488,100, filed on Mar. 2, 2023.

(51) Int. Cl.
*G01N 29/024* (2006.01)
*G01N 29/14* (2006.01)

(52) U.S. Cl.
CPC ........... *G01N 29/024* (2013.01); *G01N 29/14* (2013.01)

(58) Field of Classification Search
CPC .............................. G01N 29/024; G01N 29/14
See application file for complete search history.

(56) References Cited

U.S. PATENT DOCUMENTS

2006/0225514 A1* 10/2006 Conquergood ......... G01F 15/14
73/861
2007/0125154 A1* 6/2007 Gysling ................ G01F 1/8477
73/861.03

OTHER PUBLICATIONS

Young Meng et al., "Acoustic behaviour of an aperture backed by sound-absorbing materials under grazing flow", Journal of Sound and Vibration 446 (2019), pp. 73-90.*

(Continued)

*Primary Examiner* — Alexander Satanovsky
(74) *Attorney, Agent, or Firm* — Matthew J Patterson

(57) ABSTRACT

A fluid monitoring system is disclosed that may include a piping network having, a flexible hydraulic hose having a hose length, a hose diameter a first end portion and a second end portion. In addition, the fluid monitoring system may include a first fitting coupled to the first end portion and a second fitting coupled to the second end portion. The fluid monitoring system may include an acoustic array having a first acoustic pressure sensor positioned proximate the first fitting, a second acoustic pressure sensor positioned proximate the second fitting, and an acoustic aperture that spans an aperture length between the first acoustic pressure sensor and the second acoustic pressure sensor. The fluid monitoring system may include a processing unit that determines a speed of sound of a process fluid within the piping network and within acoustic aperture using the first acoustic pressure sensor and the second acoustic pressure sensor.

46 Claims, 12 Drawing Sheets

(56) References Cited

OTHER PUBLICATIONS

Kuo-Tsai Chen, "Study of Acoustic Transmission through Apertures in a Wall", Applied Acoustics 46 (1995), pp. 131-151.*

* cited by examiner

Multiple "N" segmented instrumented Hydraulic Hose

SYSTEMS AND METHODS FOR MONITORING HYDRAULIC SYSTEMS

CROSS REFERENCE TO RELATED APPLICATIONS

This application claims priority to Patent Cooperation Treaty Application Number PCT/US2024/018340 having an International filing date of 4 Mar. 2024, as well as U.S. Provisional Patent Application No. 63/488,100, filed on 3 Mar. 2023, the disclosure of the prior Applications are considered part of and are incorporated by reference into this patent application in their entirety.

BACKGROUND

It is known in the prior art that entrained air can cause significantly impair operability, reduce longevity, and reduce the efficiency of hydraulic systems. Entrained air can cause excess heating of the hydraulic fluid, as well as "dieseling" in which, upon compression of bubbly hydraulic fluids, the mixture ignites, causing oxidation and localized extreme temperatures, damaging seals and other surfaces.

FIG. 1 shows a schematic of a representative hydraulic system 1 of the prior art. Hydraulic system 1 includes various components including, for example, a reservoir 2, a pump 3, a control valve 4, an inline filter 5, a pressure relief valve 6 and an actuator or hydraulic cylinder 7. The various components of hydraulic system 1 comprise a piping network filled with a hydraulic fluid (such as oil) hydraulically coupled by various conduits and hoses. It is quite common for such hydraulic systems to incorporate high pressure, yet flexible along their length, hydraulic hoses as part of the piping network. These hoses are often rubber or other type of flexible material, reinforced with steel, or other high strength/high modulus material. While the length flexibility of these hydraulic hoses provides important mechanical flexibility, the construction of the hose makes installing acoustics pressure sensors with the hydraulic hoses difficult. Reservoir 2 serves several purposes including providing sufficient working fluid to allow the actuator 7 the actuate over its full range, providing for thermal expansion of the fluid, serving as a heat exchanger to cool the working fluid, and, ideally, minimizing any entrained air with the hydraulic system 1.

Entrained air can enter hydraulic systems through a variety of mechanisms, include air entrapped at oil/air interface within the reservoir, leaky seals and gaskets on the suction side of the pump, cavitation within the pump as well as out-gassing of dissolved air associated with temperature changes of the hydraulic oil. Air entrapment, and subsequent gas carry-under through the liquid outlet of a reservoir, can be an important source of entrained air with a hydraulic system. The amount of entrained air entering a hydraulic system can vary with the design of the system as well and with operating conditions, such as oil level within the reservoir and residence time of the oil within the reservoir, characteristics of the oil composition, temperature of the oil, and the amount and type of defoamers used, etc.

Entrained air can enter a hydraulic system, cause operability issues and damage components, and then exit, rendering issues with entrained air difficult to diagnose and mitigate.

Still referring to FIG. 1, hydraulic system 1 can be of the type associated with a mobile system, such as earth mover. In hydraulic system 1, the prime mover can be hydraulic pump 3 that is driven by a Power Take Off (PTO) shaft (not shown). The oil reservoir 2 can include an integrated cooling system. The components of the system can be connected by hydraulic hoses. In this particular example, actuator 7 can comprise a hydraulic motor.

Space and weight are important design parameters for many hydraulic systems, particularly mobile hydraulic systems. Mobile hydraulic systems tend to have smaller reservoirs, larger range of operating temperature, larger range of power supplied, and are subject to motion (creating sloshing in reservoir). All of these issues can cause increased variability in entrained air levels within the hydraulic system compared to stationary hydraulic systems. In addition to entrained air, contamination and oil degradation can occur and have deleterious effects on hydraulic system 1.

Mobile hydraulic systems typically utilize flexible hydraulic hoses to connect the various components, in part due to the physical constraints of installing the systems on a mobile vehicle. The flexible hoses of such mobile systems are capable of withstanding high pressures and typically have metal fittings on each end to secure the hose to the various component within the system.

The hydraulic hoses in the hydraulic system are typically terminated with some type of connector that forms a conduit that, compared to the hydraulic hose, is comparably rigid, and that facilitates connecting the hydraulic hoses to other components within the hydraulic system. These comparably rigid conduits terminating the hydraulic hoses can connect to the other components in a variety of methods. Some common connections include crimp and swage fittings and field-attachable fitting (also called quick-disconnect fittings). Typical connectors of the prior art can be found at https://www.discounthydraulichose.com/hose-fittings.html?gclid=EAlalQobChMIzsOo8_GB_QIVx8iGCh3zeQgaEAAYASAAEgLM_D_BwE.

What is needed is the ability to monitor the condition of the hydraulic fluid and to quantify the amount of entrained gas within hydraulic fluid systems on an intermittent or going basis. Quantifying the amount of entrained gas within a hydraulic system, whether the source is due to cavitation or air entrainment, leaks or other causes, would provide a significant advantage in the operation, optimization, and troubleshooting of hydraulic systems.

SUMMARY

A system of one or more computers or processing units can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a fluid measuring system may include a piping network having, a flexible hydraulic hose having a hose length, a hose diameter a first end portion and a second end portion. The fluid measuring system may also include a first fitting coupled to the first end portion and a second fitting coupled to the second end portion. The fluid measuring system may furthermore include an acoustic array having a first acoustic pressure sensor positioned proximate the first fitting, a second acoustic pressure sensor positioned proximate the second fitting, and an acoustic aperture that spans an aperture length between the first acoustic pressure sensor and the second acoustic pressure sensor. The fluid measuring system may in addition include a processing unit that determines a speed of sound of a process fluid within the piping network and within acoustic aperture using the first acoustic pressure sensor and the second acoustic pressure sensor. Other embodiments of this aspect include corresponding computer systems, apparatus, and computer programs recorded on one or more computer storage devices, each configured to perform the actions of the methods.

Implementations may include one or more of the following features. The fluid measuring system where the first acoustic pressure sensor and the second acoustic pressure sensor are not positioned on the flexible hydraulic hose. The fluid measuring system where the first fitting and the second fitting produce at least one change in a characteristic volumetric impedance within the acoustic aperture where the at least one change in a characteristic volumetric impedance is at least 25%. The fluid measuring system where the first fitting and the second fitting produce at least one change in a characteristic volumetric impedance within the acoustic aperture. The fluid measuring system may include a plurality of reflections of incident acoustic waves produced by the at least one change in a characteristic volumetric impedance in the process fluid within the aperture, and the processing unit is configured to determine the speed of sound of the process fluid within the acoustic aperture in the presence of the plurality of reflections of incident acoustic waves. The fluid measuring system where at least one of the first fitting and the second fitting may include at least a portion of a quick disconnect fitting. The fluid measuring system where the first fitting may include at least a portion of a first quick disconnect fitting and the second fitting may include at least a portion of a second quick disconnect fitting. The fluid measuring system where the first acoustic pressure sensor is positioned in the first quick disconnect fitting and the second acoustic pressure sensor is positioned in the second quick disconnect fitting. The fluid measuring system may include at least one manifold block coupled to any of the first fitting and the second fitting and where any of the first acoustic pressure sensor and the second acoustic pressure sensor is positioned in the at least one manifold block. The fluid measuring system where the first acoustic pressure sensor and the second acoustic pressure sensor are configured to be in fluid communication with the process fluid. The fluid measuring system where the first acoustic pressure sensor and the second acoustic pressure sensor may include piezo electric crystal pressure transducers. The fluid measuring system where the piping network further may include any of a reservoir, a pump, an actuator, a manifold, and a filter and where at least one of the first fitting and the second fitting is coupled to any of the reservoir, the pump, the actuator, the manifold, and the filter. The fluid measuring system may include the processing unit configured to determine an entrained air content of the process fluid using the speed of sound. The fluid measuring system may include the processing unit configured to determine a physical property of the process fluid using the speed of sound. The fluid measuring system may include the processing unit configured to determine changes in the process fluid using the speed of sound. The fluid measuring system may include the processing unit configured to determine a presence of at least one contaminate in the process fluid using the speed of sound. The fluid measuring system may include the processing unit configured to determine a diagnostic state of the piping network using the speed of sound. The fluid measuring system where the hose length is substantially equal to the acoustic aperture. The fluid measuring system where the flexible hydraulic hose is may include of an elastomer material. The fluid measuring system where the flexible hydraulic hose is may include of a composite having a plurality of materials and where the plurality of materials include at least one elastomer material and at least one reinforcing material. The fluid measuring system where the flexible hydraulic hose may include of an elastomer material having an elastic modulus of less than 1,000,000 psi and an elongation at yield of greater than 5%. The fluid measuring system where the aperture length is greater than ten times the hose diameter. The fluid measuring system where the piping network includes coherent acoustic waves, coherent vortical structures, and coherent propagating structural disturbances, and where the piping network is configured to preferentially reduce the coherence between the signals measured by the first acoustic pressure sensor and the second acoustic pressure sensor associated with the coherent vortical structures, and coherent propagating structural disturbances.

In one general aspect, the method of measuring a fluid may include providing a piping network having, a flexible hydraulic hose having a hose length, a hose diameter a first end portion and a second end portion. The method of measuring a fluid may also include a first fitting coupled to the first end portion and a second fitting coupled to the second end portion. The method of measuring a fluid may furthermore include an acoustic array having a first acoustic pressure sensor positioned proximate the first fitting, a second acoustic pressure sensor positioned proximate the second fitting, and an acoustic aperture that spans an aperture length between the first acoustic pressure sensor and the second acoustic pressure sensor. The method of measuring a fluid may in addition include providing a processing unit. The method of measuring a fluid may moreover include determining, with the processing unit, a speed of sound of a process fluid within the piping network and within acoustic aperture using the first acoustic pressure sensor and the second acoustic pressure sensor.

Implementations may include one or more of the following features. The method of measuring a fluid may include positioning the first acoustic pressure sensor and the second acoustic pressure sensor beyond the first end portion and the second end portion of the flexible hydraulic hose. The method of measuring a fluid may include producing at least one change in a characteristic volumetric impedance within the acoustic aperture where the at least one change in a characteristic volumetric impedance is at least 25%. The method of measuring a fluid may include producing at least one change in a characteristic volumetric impedance within the acoustic aperture. The method of measuring a fluid may include producing a plurality of reflections of incident acoustic waves using the at least one change in a characteristic volumetric impedance in the process fluid within the aperture, and determining with the processing unit the speed of sound of the process fluid within the acoustic aperture in the presence of the plurality of reflections of incident acoustic waves. The method of measuring a fluid where at least one of the first fitting and the second fitting may include at least a portion of a quick disconnect fitting. The method of measuring a fluid where the first fitting may include at least a portion of a first quick disconnect fitting and the second fitting may include at least a portion of a second quick disconnect fitting. The method of measuring a fluid may include positioning the first acoustic pressure sensor in the first quick disconnect fitting and positioning the second acoustic pressure sensor in the second quick disconnect fitting. The method of measuring a fluid may include coupling at least one manifold block to any of the first fitting and the second fitting and positioning any of the first acoustic pressure sensor and the second acoustic pressure sensor in the at least one manifold block. The method of measuring a fluid may include positioning the first acoustic pressure sensor and the second acoustic pressure sensor in fluid communication with the process fluid. The method of measuring a fluid where the first acoustic pressure sensor and the second acoustic pressure sensor may include piezo electric crystal pressure transducers. The method of measuring a fluid where the piping network further may include any of a reservoir, a pump, an actuator, a manifold, and a filter, the method may include coupling at least one of the first fitting and the second fitting to any of the reservoir, the pump, the actuator, the manifold, and the filter. The method of measuring a fluid may include determining, with the processing, an entrained air content of the process fluid using the speed of sound. The method of measuring a fluid may include determining, with the processing unit, a physical property of the process fluid using the speed of sound. The method of measuring a fluid may include the processing unit configured to determine changes in the process fluid using the speed of sound. The method of measuring a fluid may include determining, with the processing unit, a presence of at least one contaminate in the process fluid using the speed of sound. The method of measuring a fluid may include determining, with the processing unit, a diagnostic state of the piping network using the speed of sound. The method of measuring a fluid where the hose length is substantially equal to the acoustic aperture. The method of measuring a fluid where the flexible hydraulic hose is may include of an elastomer material. The method of measuring a fluid where the flexible hydraulic hose is may include of a composite having a plurality of materials and where the plurality of materials include at least one elastomer material and at least one reinforcing material. The method of measuring a fluid where the flexible hydraulic hose is may include of an elastomer material having an elastic modulus of less than 1,000,000 psi and an elongation at yield of greater than 5%. The method of measuring a fluid where the aperture length is greater than ten times the hose diameter. The method of measuring a fluid where the piping network includes coherent acoustic waves, coherent vortical structures, and coherent propagating structural disturbances, and the method further may include reducing the coherence between the signals measured by the first acoustic pressure sensor and the second acoustic pressure sensor associated with the coherent vortical structures, and coherent propagating structural disturbances. Implementations of the described techniques may include hardware, a method or process, or a computer tangible medium.

DETAILED DESCRIPTION

Figure 1:
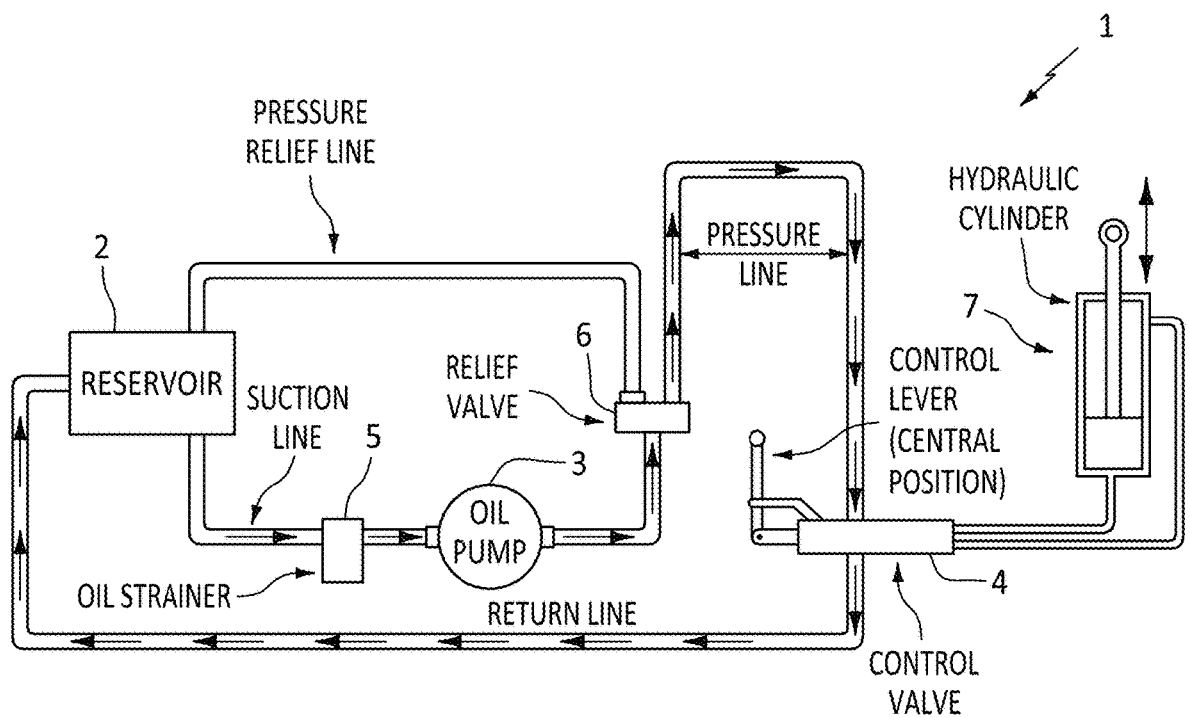
FIG. 1 is a schematic diagram of a hydraulic system of the prior art.

As part of the present disclosure, systems and methods are described to monitor the condition of a fluid within a hydraulic system. In certain implementations, a system and method are disclosed to measure the entrained air in an industrial hydraulic system. The system and method of this implementation includes the installation of a first acoustic pressure sensor in, or near, a first component within a hydraulic system and a second acoustic pressure sensor installed in, or near, to the of a second component of the hydraulic system, in which the first and second components are connected by a flexible hydraulic conduit. For the purposes of this disclosure, a flexible hydraulic conduit, also referred to as a flexible hydraulic hose, or simply a hydraulic hose, includes conduits that comprise composite material having one or more layers in which at least one layer contains an elastomer material, including any suitable type of rubber, any of which can be a tough elastic polymeric substance made from the latex of a tropical plant or made synthetically or a rubber-like substance and in which any of the at least one or more layers may contain reinforcing material such as steel wires or textile fibers such as fiberglass or Kevlar. For the purposes of this disclosure any substance with an elastic modulus of less than 1,000,000 psi and an elongation at yield of greater than 5% is defined as a rubber-like substance. A hydraulic conduit formed therefrom as described above is considered a flexible hydraulic hose or flexible hydraulic conduit. In general, the reinforcing layer(s) enable flexible hydraulic conduits to be capable of withstanding larger pressure differentials between the inside and the outside of the flexible hydraulic conduit, while maintaining flexibility in directions orthogonal to the centerline of the flexible conduit. Flexible hydraulic conduit is often used where connection between two elements of a hydraulic network is required, but where the path over which the connection is made not well defined, needs to change effective length or needs to vary in effective length with time as components to which they are attached move relative to one another. Flexible hydraulic conduits are widely used in mobile hydraulic systems. Flexible hydraulic conduits are well-suited for transferring hydraulic fluid over a range of pressures without transferring significant structural loads between two components. Flexible hydraulic conduit is contrasted to rigid conduits such as steel piping or metal piping and heavy plastic piping. Flexible hydraulic hose typically have minimum bend radius of on the order of 5 times the outer diameter of the flexible hydraulic conduit. The minimum bend radius is defined herein notionally as the minimum radius of curvature that a conduit can be bent without exceeding the elastic strain limit, or damaging, of any elements within the flexible conduit.

Most flexible hydraulic conduits have a specified minimum bend radius where applications in with the conduit is bend in a radius less than the minimum bend radius are not recommended due to likely premature failure. Flexible hydraulic conduits can also be contrasted to metal tubing. While metal tubing can be deformed to relatively small bend radii, the metal typically yields under deformation, thereby exceeding the elastic strain limit of the material, and resulting in the metal tubing deforming into an essentially rigid conduit deformed to a new shape.

It is noted that more than two sensors could be used as well, but, as an example, this disclosure describes at least one embodiment of the current invention which utilizes two acoustic sensors. The electronic output of the two acoustic sensors is monitored in a manner in which the temporal variations in the output of each sensor is recorded for each of the sensors forming what is typically referred to as a phased-array. In one embodiment, a two sensor phased-array, or simply "array", is an acoustic array that has an acoustic aperture that spans at least a part of the length of the flexible hydraulic conduit and has an acoustic aperture length equal to the pathwise length of the conduit between the two acoustic pressure sensors comprising the two sensor array, or substantially the length of the flexible hydraulic conduit. The output of the acoustic pressure sensors comprise electric signals corresponding to, at least in part, pressure variations associated with essentially one dimensional sound waves propagating within the hydraulic piping network. The acoustic pressure sensors are electrically connected to a process module that utilizes the output of the two acoustic sensors to determine the process fluid sound speed within the acoustic aperture length of the acoustic array. With the sound speed known, and the static pressure within the line either known, measured, or estimated, and the density of the liquid and the composition of the gas phase either known, measured, or estimated, and the polytropic exponent either known, measured, or estimated, and the compliance introduced by elasticity of the conduit either known, measured, or estimated, Wood's equation can be used to determine the gas void fraction within the conduit connecting the two measurement locations. It has been discovered that the speed of sound can be effectively measured with the system described above to provide a practical and effective means of measuring the sound speed of a hydraulic fluid within hydraulic systems.

For sound propagating within a conduit for which the wavelength is large compared to both fluid inhomogeneities and the cross-sectional length scale of the conduit, Wood's equation [12,13] relates the sound speed, $a_{mix}$, and density, $\rho_{mix}$ of a mixture consisting of "N" components to the volumetric phase fraction, $\varphi_i$, density, $\rho_i$ and sound speed, $a_i$ of each component of the mixture. The elasticity of the conduit, given in Equation 1 below for a thin-walled, circular cross section conduit of diameter D and wall thickness of t and modulus of E, also influences the propagation velocity.

$$\frac{1}{\rho_{mix}a_{mix}^2} = \sum_{i=1}^{N} \frac{\varphi_i}{\rho_i a_i^2} + \frac{D-t}{Et} \quad \text{(Equation 1)}$$

Note, the last term represents the effect of the compliance of the conduit. Where the mixture density, $\rho_{mix}$, is given by:

$$\rho_{mix} = \sum_{i=1}^{N} \rho_i \varphi_i \quad \text{(Equation 2)}$$

For bubbly liquids, Wood's equation can be expressed as a combination of a gas and liquid phase as follows:

$$\frac{1}{\rho_{mix}a_{mix}^2} = \frac{\alpha}{\rho_{gas}a_{gas}^2} + \frac{1-\alpha}{\rho_{liq}a_{liq}^2} + \frac{D-t}{Et} \quad \text{(Equation 3)}$$

Where the mixture density is given by:

$$\rho_{mix} = \alpha\mu_{gas} + (1-\alpha)\mu_{liq} \quad \text{(Equation 4)}$$

The mixture speed of sound can be expressed as a function of the gas void fraction and the fluid properties and properties of the conduit as follows:

$$a_{mix} = \frac{1}{\sqrt{\rho_{mix}\left(\frac{\alpha}{\rho_{gas}a_{gas}^2} + \frac{1-\alpha}{\rho_{liq}a_{liq}^2} + \frac{D-t}{Et}\right)}} \quad \text{(Equation 5)}$$

For cases in which the volumetrically-weighted compressibility of the gas phase is dominant source of compressibility of the mixture, which is typically a good approximation at near ambient conditions with gas void fractions >~0.1%, the gas void fraction scales with the inverse of the square of the process fluid sound speed:

$$\alpha \cong \frac{\gamma P}{\rho_{liq}a_{mix}^2} \quad \text{(Equation 6)}$$

Where $\gamma$ is the polytropic exponent governing the compressibility of the gas bubbles and P is the process pressure.

The sound speed of the gas is expressed as a function of gas temperature, T, the gas constant, R, and the polytropic exponent γ.

$$a_{gas} = \sqrt{\gamma R T} \qquad \text{(Equation 7)}$$

The appropriate polytropic exponent depends on the frequency of the sound waves compared to a thermal relaxation frequency set by the bubble diameter and the thermal diffusivity of the gas [Fu, K. "Direct Numerical Study of Speed of Sound in Dispersed Air-Water Two-Phase Flow", WaveMotion, Vol 98, November 2020]. For air bubbles, this polytropic exponent can range from isothermal conditions, γ=1.0, for low frequencies compared to the thermal relaxation frequency, to isentropic conditions, γ=1.4, for high frequencies compared to the thermal relaxation frequency. Note that polytropic exponent for gases undergoing isentropic compression and expansion is given by the ratio of the specific heat at constant pressure to the specific heat of air at constant volume.

Prior art systems and methods to determine the speed of sound of a fluid within a conduit have been limited to arrays of acoustic sensors positioned on conduits having a non-changing characteristic volumetric acoustic impedance (defined below and in Munjal). As will be disclosed in more detail hereinafter, changes in characteristic volumetric acoustic impedance can result in significant acoustic reflections that interfere with the ability of prior art systems to identify the one dimensional sound wave propagating within the hydraulic piping network. It has been discovered that, although reflections do impair the ability of array processing techniques to determine the speed of sound in a piping network compared to piping network without any reflections internal to the aperture of the acoustic array, the array processing techniques disclosed herein can be utilized effectively to determine the process fluid sound speed within acoustic arrays with apertures that span a section of flexible hydraulic conduit with surprising flexibility and in novel applications.

Figure 2:
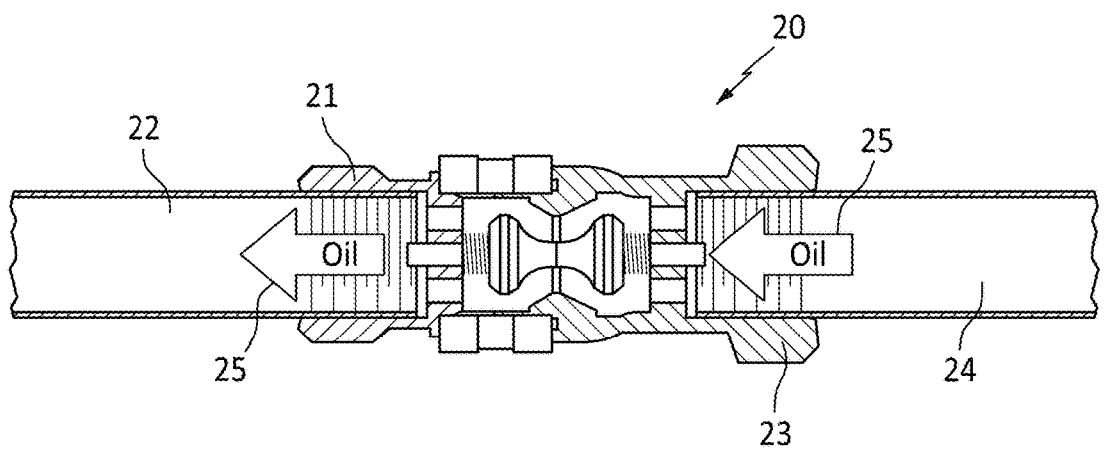
FIG. 2 is a schematic diagram of a connector for use in a hydraulic system of the prior art.

Referring to FIG. 2, there is shown a cross sectional rendering of a quick disconnect coupling 20 of the prior art that can be part of a piping network. Quick disconnect coupling 20 includes male coupling half 21 attached to a first hydraulic hose 22 and female coupling half 23 attached to a second hydraulic hose 24. As shown, hydraulic fluid 25 can flow through quick disconnect coupling 20 in the coupled position. As is known, quick disconnect couplings 20 have several components that serve to shut-off the flow area when the connector is disconnected, and allow fluid connectivity when connected. As part of the current disclosure, and assuming a quick disconnect fitting is installed between two sections of hydraulic hose to form a piping network, the internal cross sectional area changes over the length of the piping network from the diameter of first hydraulic hose 22, through the internal diameter variations associated with the quick disconnect coupling 20 and the diameter of second hydraulic hose 24. The cross sectional area within quick disconnect coupling 20 varies and differs significantly—and is typically significantly reduced—from the cross sectional area of the hydraulic hoses 22, 24. It is noted that embodiments of this disclosure are also applicable to other types of connectors or fittings used to terminate hydraulic hose and provide fluid communication to other hoses or other components in a hydraulic network such as pumps, reservoirs, manifolds, etc.

Although used merely as an example, the reduced cross section area of quick disconnect coupling 20, as well as other type of connectors, such as threaded and or crimped connectors, result in a pressure drop in the hydraulic fluid 25 across the connector pair 21, 23. This pressure drop is primarily due to the acceleration of oil 25 through the smaller cross sectional areas of quick disconnect coupling 20. In addition to creating a pressure loss in the system, cross sectional area change produces a change in the characteristic volumetric acoustic impedance of the piping network. The pressure loss can result in changes in the gas void fraction of the hydraulic fluid due to the introduction of outgassing due to the pressure drop or simply additional outgassing and expansion of gas that may already be present in the hydraulic fluid. Increases in gas void fraction typically result in significant changes in the characteristic volumetric acoustic impedance associated with the process fluid within the piping network. This change in cross sectional area, and pressure loss, and changes in gas void fraction, can result in significant characteristic volumetric acoustic impedance and therefore significant acoustic reflections, and associated transmission loss, for a one dimensional sound wave propagating within the oil of a hydraulic piping network.

Referring to Equation 8 below, the reflection coefficient R, defined as the ratio of a reflected one dimensional acoustic wave B associated with an incident acoustic wave of amplitude A incident upon a simple area change from first area S1 to a second area S2:

$$R \equiv \frac{B}{A} = \frac{1 - \frac{S_2}{S_1}}{1 + \frac{S_2}{S_1}} = \frac{S_1 - S_2}{S_1 + S_2} \qquad \text{(Equation 8)}$$

It should be noted that in hydraulic piping networks comprised of sections of hoses and connectors (or fittings), area ratios of S2/S1=0.5 or smaller are not uncommon. An area ratio of 0.5 results in a relatively significant reflection coefficient of 0.33, indicating that at such an area change, ⅓ of the incident acoustic pressure field is reflected back into the hose. It is also noted that this estimate is offered as an example, and does not include effects that would serve only serve to increase the transmission loos and reflections such as an increase in gas void fraction that typically accompany area restriction.

As part of the present disclosure, the effects of these reflections are modelled utilizing one-dimensional acoustics. For one-dimensional acoustic pressure fields for which the speed of sound is much larger than the flow velocity (i.e. $M_x = U_x/a \ll 1$ where $M_x$ is the Mach number, $U_x$ is the flow velocity and a is the speed of sound), the acoustic pressure and the acoustic axial velocities perturbations of the one-dimensional acoustic waves can be expressed as a function of position and time as follows:

$$P_i(x,t) = A_i e^{i(\omega t - kx)} + B_i e^{i(\omega t + kx)} \text{ and } U_i(x,t) = (A_i e^{i(\omega t - kx)} - B_i e^{i(\omega t + kx)})/\rho c \qquad \text{(Equation 9)}$$

Where $A_i$ and $B_i$ represent the complex amplitudes of the right and left (or forward and backward) travelling pressure waves respectively travelling within the $i^{th}$ region in which the characteristic volumetric acoustic impedance is essentially constant. Additionally, ω is the temporal frequency in rad/sec, $k = \omega/a_{mix} = 2\pi/\lambda$, is the wave number, $a_{mix}$ is the speed of sound, and where λ is the acoustic wavelength.

In modelling acoustic networks which contain area changes, the effect of area changes are typically modelled by assuming that right and left travelling waves exist in regions upstream and downstream of an area change, and then relating the complex amplitudes of the pressure fields upstream and downstream of the area discontinuity by applying momentum and continuity conditions across the area change as commonly used in the art and as described in (Munjal, M. L. Acoustics of Ducts and Mufflers, ISBN 0-471-84738-0)

With reference to Munjal disclosed herein above, the acoustic impedance (z) of an acoustic wave propagating in a free space is typically defined as the ratio of the acoustic pressure perturbation (p) to the acoustic velocity perturbation (u). This ratio is a property of the fluid and given by:

$$z \equiv \frac{p}{u} = \rho c \qquad \text{Equation 10}$$

Where $\rho$ is the density of the fluid and c is the speed of sound of one dimensional acoustic waves.

For one-dimensional acoustics propagating within a duct, the ratio of the acoustic pressure (p) in a one-dimensional acoustic wave to the acoustic volumetric velocity (uS), where S is the cross sectional area of the duct, with reference to Munjal again, is perhaps a more relevant characteristic of the one-dimensional acoustic properties of a fluid within a duct. This ratio can be defined as the characteristic volumetric impedance of a fluid within duct (Y), where Y is defined as:

$$Y \equiv \frac{p}{uS} = \frac{\rho c}{S} \qquad \text{Equation 11}$$

Note that for a fluid with constant density and sound speed, a 20% reduction in cross sectional area which is common in many hydraulic system would result is a 25% increase in the characteristic volumetric impedance within a duct. Note additionally that the change in compliance of the conduit, as described by Wood's equation, also changes propagation speed of the one-dimensional sound wave, and this results a change in the effective characteristic volumetric impedance of a fluid within duct (Y), and will, in general, result in reflections. For example, an acoustic wave propagating in a fluid in a steel conduit would experience a change in effective characteristic volumetric impedance, and a reflection, at an interface with a flexible hydraulic conduit Consider the piping network 45 depicted in FIG. 9 as a simplified model of a hydraulic hose 48 connecting two components in a piping network 45. The acoustic model has three regions, the first component inlet pipe 46, a hydraulic hose 48, and the second component outlet pipe 50. The coupling 47 is considered as Region 1 having a length of $\Delta X$ and a cross sectional area $S_1$; the length of hydraulic hose 48 is considered as Region 2 having a length of L and a cross sectional area $S_2$ and the coupling 49 is considered as Region 3 having a length of $\Delta X$ and a cross sectional area $S_3$. For purposes of this example, the relative coordinate system comprises transducer 52 at position $X_1 = -\Delta X$; the interface between coupling 49 and hydraulic hose 48 at position $X_2 = 0$; the interface between coupling 47 and hydraulic hose 48 at position $X_3 = L$; and transducer 52 at position $X_4 = L + \Delta X$. The component regions in general represent components within a hydraulic system and may specifically represent any elements in a hydraulic network including for example connectors, pumps, filters, reservoirs, manifolds, or actuators The pressure fields in Region 1 and Region 3 can be related to each other by applying pressure (momentum) and mass flow (continuity) at each of the interfaces, with the first interface at x=0, $$P_{x=0^-} = P_{x=0^+} \text{ and } S_1 U_{x=0^-} = S_2 U_{x=0^+} \qquad \text{(Equation 12)}$$

and the second interface at x=L (length of flexible hose 48), $$P_{x=L^-} = P_{x=L^+} \text{ and } S_2 U_{x=L^-} = S_3 U_{x=L^+} \qquad \text{(Equation 13)}$$

Note this analysis neglects any effects associated with the change in compliance of the conduits at the interfaces. Applying these relationships, the pressure fields in each of the regions can be related as follows:

(Equation 14)

$$\begin{bmatrix} -e^{ikx_2} & e^{-ikx_2} & e^{ikx_2} & 0 \\ -e^{ikx_2} & -\frac{s_2}{s_1}e^{-ikx_2} & \frac{s_2}{s_1}e^{ikx_2} & 0 \\ 0 & -e^{-ikx_3} & e^{ikx_3} & -e^{-ikx_3} \\ 0 & -e^{-ikx_3} & e^{ikx_3} & \frac{s_3}{s_2}e^{-ikx_3} \end{bmatrix} \begin{Bmatrix} B_1 \\ A_2 \\ B_2 \\ A_3 \end{Bmatrix} = \begin{Bmatrix} A_1 e^{-ikx_2} \\ -A_1 e^{-ikx_2} \\ B_3 e^{ikx_3} \\ B_3 \frac{s_3}{s_2} e^{ikx_3} \end{Bmatrix}$$

Using these relationships, pressures at the locations of sensors 52, 54 can be simulated and the simulated pressures can be used as input to beam forming algorithms to assess the ability of the beamforming algorithms to determine the speed of sound based on these simulated measurements for a range of flow path geometries.

Specifically, for an acoustic pressure field with a right traveling wave (in the positive X direction) in Region 1 with complex amplitude $A_1$, and a left traveling wave (in the negative X direction) in Region 1 with a complex amplitude of $B_1$, and a right traveling wave (in the positive X direction) in Region 3 with complex amplitude $A_3$, and a left traveling wave (in the negative X direction) in Region 3 with a complex amplitude of $B_3$, the measured pressures at pressure transducers, 52 and 54 normalized by the amplitude of $A_1$, are given by:

$$p_{52}(\omega)/A_1 = e^{i(\omega t - kx_1)} + B_1/A_1 e^{i(\omega t - kx_1)} \qquad \text{Equation 15}$$

$$p_{54}(\omega)/A_1 = A_3/A_1 e^{i(\omega t - kx_4)} + B_3/A_1 e^{i(\omega t - kx_4)} \qquad \text{Equation 16}$$

Where $\omega$ is the temporal frequency in radians/second, t is time in seconds, k is the wavenumber, where $$k = \frac{\omega}{a_{mix}} = \frac{2\pi}{\lambda},$$

where $a_{mix}$ is the mixture sound speed and $\lambda$ is the wavelength and where the complex amplitudes of $B_1$ and $A_3$ are given terms of $A_1$ and $B_3$ by Equation 14. Note, for clarity, $A_i$ is the complex amplitude of the right travelling wave in the $i^{th}$ region, and $B_i$ is the complex amplitude of the left traveling wave in the $i^{th}$ region. The relationships of Equations 15 and 16 represent Fourier coefficients for each frequency of the simulated pressures measured at the locations of the pressure transducers 52 and 54. Performing the simulation in this manner results in a general condition in which can model conditions for which there are arbitrary levels of right traveling waves, $A_1$, in Region 1 and left traveling waves, $B_3$, in each Region 3 of the flow field.

Figure 3:
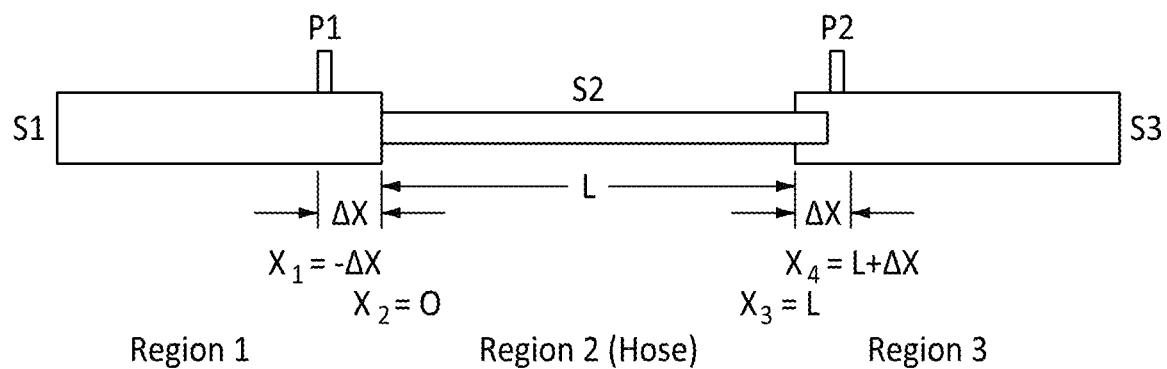
FIG. 3 is a schematic representation of a hydraulic monitoring system in accordance with the present disclosure.
Figure 4A:
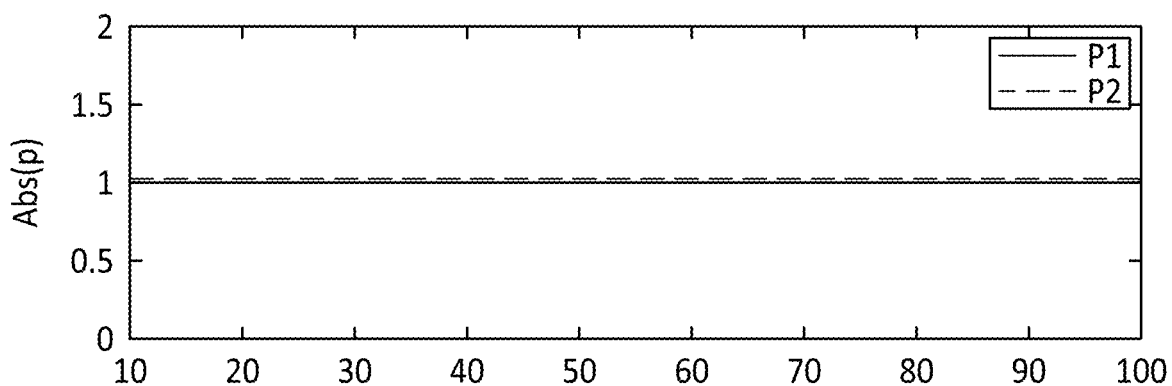
FIG. 4A is a graphical representation of the relative amplitude between a pair of acoustic sensors in accordance with the present disclosure.
Figure 4B:
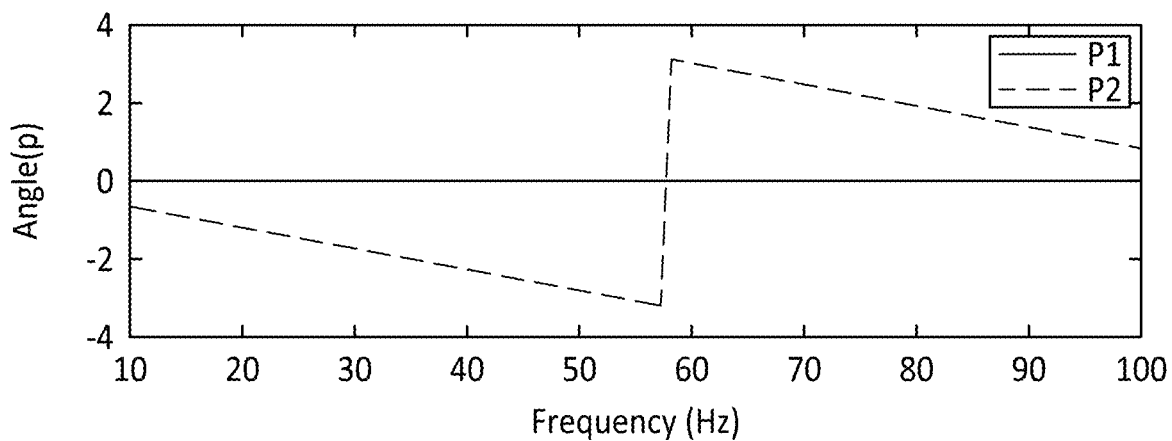
FIG. 4B is a graphical representation of the phase angle between a pair of acoustic sensors in accordance with the present disclosure.

Referring now to FIGS. 3, 4A and 4B, there is shown an example of the effect of area discontinuities on the simulated pressure at the locations of two transducers. With specific reference to FIG. 3, there is shown a schematic of a hydraulic piping network having a Region 1 with a cross section area S1 and an acoustic pressure sensor P1 positioned at a distance $-\Delta X$ from an end thereof, a Region 2 comprised of a flexible hydraulic hose with a cross section area S2 and having a length L and having a Region 3 with a cross section area S3 and an acoustic pressure sensor P2 positioned at a distance $\Delta X$ from an end thereof. It should be understood by those skilled in the art that the length of the acoustic aperture of FIG. 3 is the distance between P1 and P2 and is equal to L+2($\Delta X$). FIGS. 4A and 4B show the magnitude and phase of the pressure simulated at each transducer PP1, PP2 for a unit amplitude right traveling wave in Region 1, i.e, $A_1=1$ and no sound propagating to the left in Region 3, i.e. $B_3=0$. For clarity, $B_3=0$ implies both no reflections at the termination of Region 3, i.e. anechoic, and no sources of sound that would generate sound propagating to the left in Region 3, or some combination of the two that results in $B_3=0$. The sound speed of the fluid in the simulation is 600 ft/sec. $\Delta X$ is 1 inch, and L is 60 inches, and S1=S2=S3 for the simulation of FIGS. 3 and 4. For this configuration the sound field is propagating in a constant amplitude right traveling wave through the simulation region, and with the phase of sensor P2 lagging sensor P1 linear with frequency, consistent with a pure time associated with a pressure field consistent with a sound field with a constant amplitude, broad band acoustic waves propagating in the right (positive X) direction.

Figure 5:
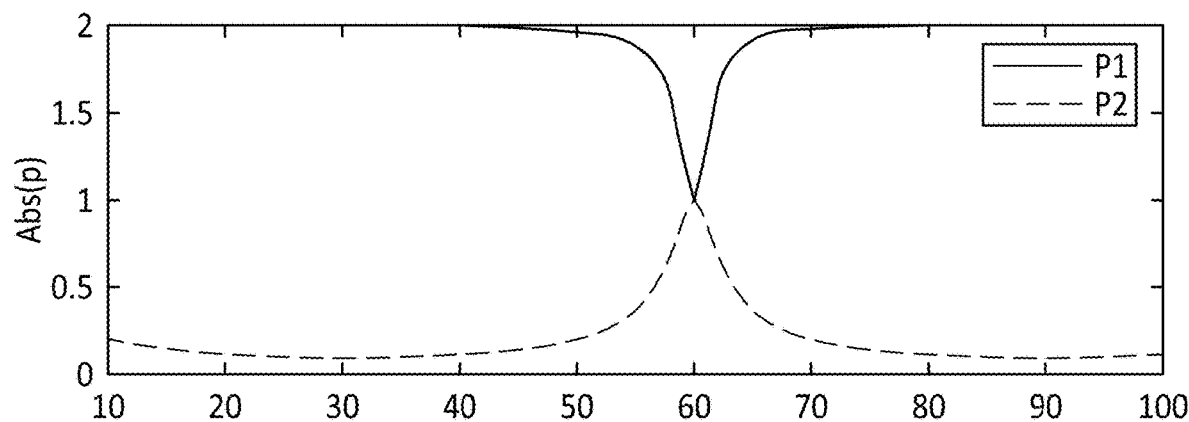
FIG. 5 is a graphical representation of the relative amplitude between a pair of acoustic sensors in accordance with the present disclosure.
Figure 6:
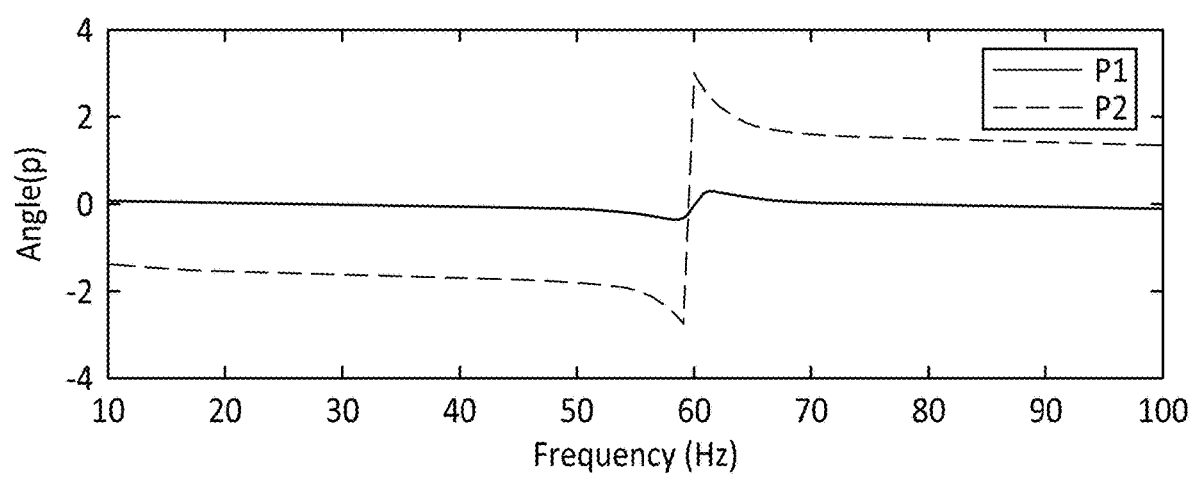
FIG. 6 is a graphical representation of the phase angle between a pair of acoustic sensors in accordance with the present disclosure.

FIGS. 5 and 6 show the magnitude and phase of each pressure transducer P1 and P2 for the same configuration depicted schematically in FIG. 3, but with a 20× area reduction from Region 1 to Region 2, and a 20× area increase from Region 2 to Region 3. As shown, the magnitude and phase relationship between the two sensors is quite different from that shown in FIGS. 4A and 4B, with the area changes at either end of the hose (modeled as Region 2) setting up an acoustically resonant cavity within the hose. The resonance is indicated by the peak in the pressure response of a transducer P2 and the minimum in the response of transducer P1. This resonance corresponds to the ½ wavelength resonance of Region 2, and occurs at 60 Hz where:

$f*\lambda = a_{mix}$ (Equation 17);

$\lambda = 2L$ (Equation 18); and $f = \frac{a_{mix}}{2L} = \frac{600 \text{ ft/sec}}{2*5 \text{ ft}} = 60 \text{ Hz}$ (Equation 19)

For this configuration, the area changes significantly reduce the propagation of sound through the acoustic aperture of the array for most frequencies except for frequencies near this resonant frequency, at which the sound propagates through the acoustic aperture minimally impeded.

Since area changes and changes in gas void fraction associated with the pressure drop due to area restrictions and, to some degree, increased compliance of hydraulic hoses can set up strong reflections at the entrance and exit of hydraulic hoses, it is of interest to determine if the simulated measured pressures from an acoustic array whose acoustic aperture contains a transition to and from a flexible hydraulic hose, can be interpreted in terms of the process fluid sound speed utilizing beamforming algorithms. It is important to recognize that the this analysis only considers reflections due to area changes, and does not consider the potentially larger effects due to the potential effect that the change in gas void fraction of process fluid due to pressure drop through area changes could have on the characteristic volumetric acoustic impedance of the process fluid. As such, this analysis is offered to demonstrate how a simplified model including only the effect of area changes can impair the performance of a beam forming techniques on representative application scenarios.

Beamforming, as used herein, involves defining a steering vector that accounts for an expected phase shift among the measured, or in this case simulated, pressures associated with a trial process fluid sound speed. In the prior art, beamforming algorithms for determining flow parameters, such as flow velocity and process fluid speed of sound, have been applied to measurements from acoustic pressure sensors for which the cross sectional area of the fluid conduit within the aperture of the array is constant, and for which there are not significant internal acoustic reflections within the array, nor for which there was significant sound generation within the array.

The steering vector for data measured from pressure transducers P1, P2 of FIG. 3 (and 52, 54 of FIG. 9) is given by the following:

$$E = \begin{Bmatrix} e^{-ikx_1} \\ e^{-ikx_4} \end{Bmatrix}$$ (Equation 20)

Where k is defined as the wave number, $$k = \frac{\omega}{c},$$

where c is the speed of sound and $\omega$ is the frequency in radians/sec. In this formulation of the steering vector, positive wave numbers are associated with waves traveling in the positive "X" direction (from left to right) and negative wave numbers are associated with waves traveling in the negative "X" direction (from right to left).

The cross spectral density matrix is composed of the cross spectral densities of the measured or simulated pressures at each location:

$$CSD = \begin{bmatrix} P_{11} & P_{14} \\ P_{41} & P_{44} \end{bmatrix}$$ (Equation 21)

Where $P_{ij}=P_i*P^*_j$, where $P_i$ and $P^*_j$ are the Fourier transforms of the pressures at location i and the complex conjugate of the Fourier transform at location j.

Following techniques described in D. H. Johnson and D. E. Dudgeon. *Array Signal Processing, Concepts and Techniques*. PTR Prentice-Hall, Upper Saddle River, NJ, 1993, the beamforming optimization process of the current disclosure involves adjusting the steering vector, which is a function of the speed of sound of the process fluid, to maximize the power associated with a given steering vector. The power of the array is given by the following:

$P=E^T[CSD]E$ (Equation 22)

Where $E^T$ is the conjugate transpose of the steering vector, E.

Figure 7:
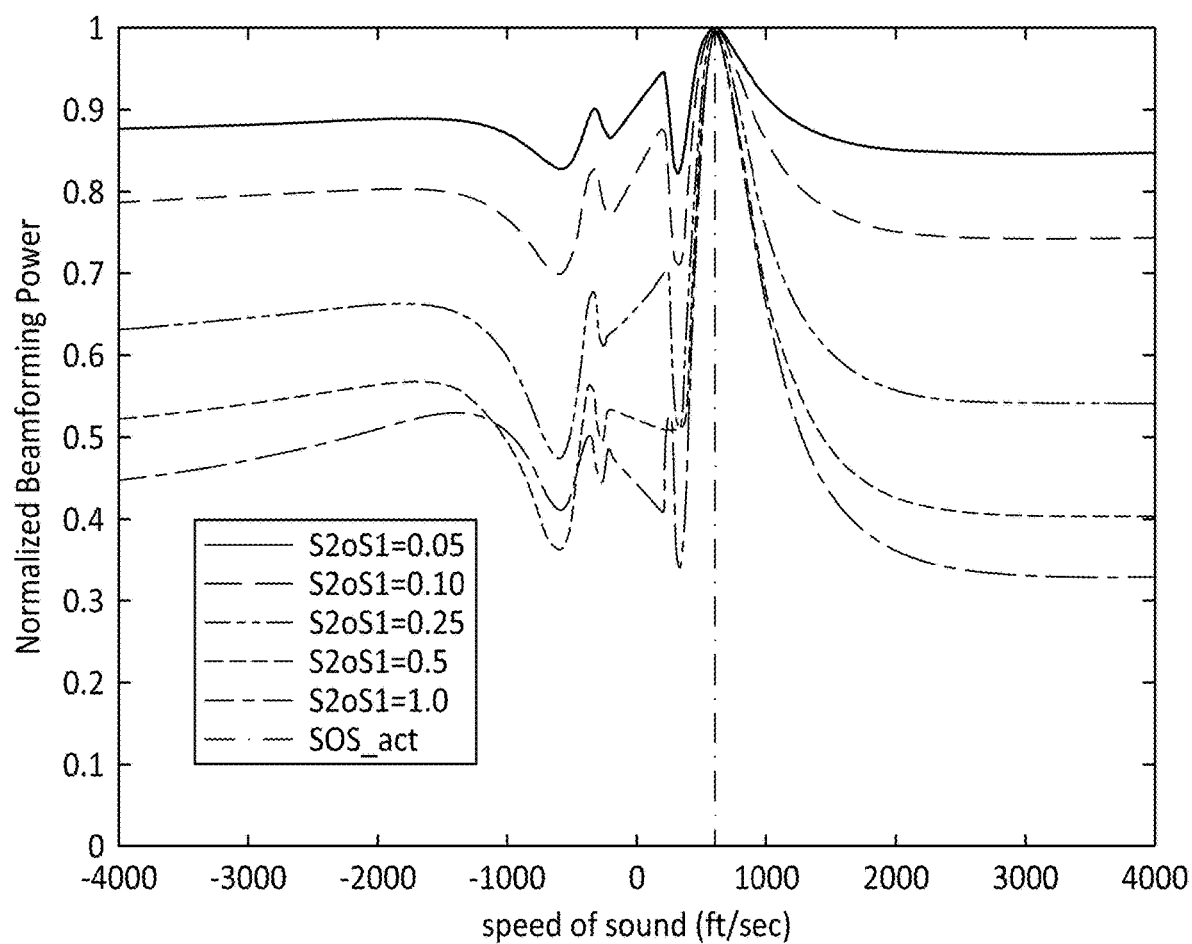
FIG. 7 is a graphical representation of the normalized beamforming power for various area ratios in accordance with the present disclosure.
Figure 9:
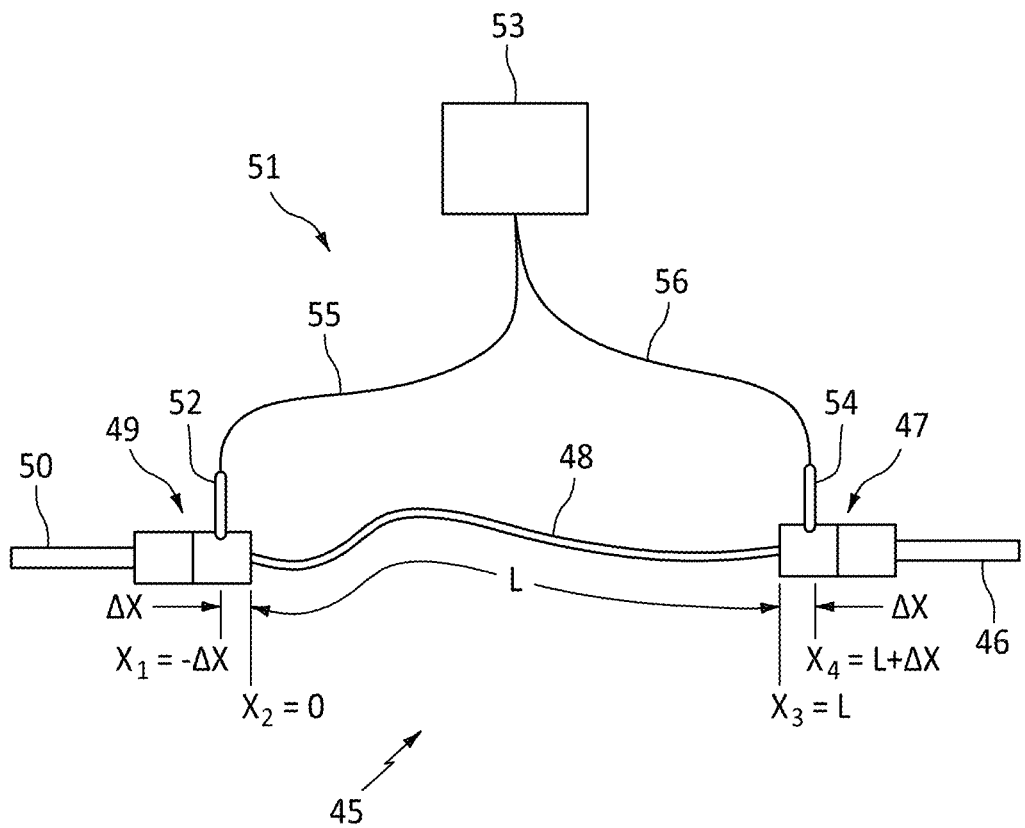
FIG. 9 is a schematic representation of a hydraulic monitoring system in accordance with the present disclosure.

FIG. 7 is a graphical representation of an example of determining the speed of sound from an array of two pressure transducers using beam forming techniques utilizing simulated data for the configuration described above as a function of the ratio of the area contraction, with further reference to FIG. 9, at couplings 47 (Region 1), 49 (Region 2) and area expansion entering and exiting the hose 48 (Region 2) section.

In FIG. 7, area change ratios of 0.05, 0.10, 0.25, 0.5 and 1 are shown wherein the area change ratio of 1 comprises no area change. Inventively, and as shown, although the configuration without the area change (area change ratio of 1) provides the most well defined determination of sound speed within the array, the beam forming techniques are shown to provide an accurate estimate of the process fluid sound speed under the idealized assumptions of the analysis for a wide range of area changes between region 1 and 2 and regions 2 and 3, a model which is offered as representative of a hydraulic hose with fittings on either end with pressure transducers installed in each fitting.

As indicated by FIG. 7, the presence of the changes in the characteristic volumetric acoustic impedance associated with the area discontinuities does degrade the ability of the beam forming techniques to identify the speed of sound of the process fluid compared to an array without any changes in the characteristic volumetric acoustic impedance. The implications of this degradation depend on the signal to noise environment of the sensors, and the degree to which other coherent signals within the array are present. The current disclosure inventively leverages several aspects of the current embodiment to optimize the performance of the beam forming methods to determine the process fluid sound speed under conditions within which the characteristic volumetric acoustic impedance varies within the array. These inventive aspects are developed in more detail below and include: 1) measuring the speed of sound within a flexible conduit minimizes any coherent structural waves that are generally readily transmitted through rigid conduits (wherein these structural waves can include bending wave, torsional waves, shear waves, compression waves and others) and where these propagating structural waves result in coherent signals within multiple pressure transducers within the array due to, for example, cross talk in the form of sensitivity of pressure transducers to acceleration; 2) the relatively long length of typical hydraulic hoses enables longer acoustic apertures and thereby the use of lower frequency sound to determine the process fluid speed of sound (wherein low frequency sound is typically present at higher amplitude than higher frequency sound which attenuates more quickly in bubbly liquids and offers improve signal to noise); 3) the long length of hydraulic hoses compared to the diameter of the hydraulic hose typically ensures that the length of the acoustic aperture of the acoustic array exceeds the effective coherent length of vortical disturbances, minimizes the degree to which coherent pressure disturbance due to vortical disturbances are measured at multiple pressure sensors within the array; and 4) porting directly into the process flow lines at the fittings enables a direct measurement of the unsteady pressure within the flow lines, which minimizes the amount of structural cross talk contained in the pressure signals compared to, for example, sensors designed to measure unsteady pressure within an effectively rigid conduit utilizing a measurement of the strain in the conduit itself.

In real world applications of array processing, various noise sources and signals from competing coherent disturbances can serve to impair the ability of beamforming algorithms to interpret the output of a sensor array to determine the desired properties of a propagating sound field. As indicated by the analysis disclosed herein above, reflections produced within the array can impair the interpretation of the process fluid sound speed. Noise sources can include electrical noise, signal cross talk, etc. Other sources of coherent disturbances that can impair the ability of a beamforming algorithm to determine a process fluid sound speed include coherent vortical disturbances and coherent structural vibrations picked up by the pressure sensors, as discussed above.

Heretofore, gas void fraction meters that utilize array processing techniques to measure a process fluid sound speed to determine the gas void faction of a process fluid of the prior art utilize numerous sensors within a linear array to help discern the desired information, i.e. the speed of sound, by interpreting the output of an array of sensors measuring the strain within an essentially rigid conduit in the presence of noise sources and other coherent disturbances on an array. An example from the prior art, is SONARtrac® commercially available from CiDRA Corporation. The SONARtrac® product utilizes 8 strain based sensors in their commercial clamp-on strain-based sensors that measure the dynamic strain in an essentially rigid conduit to determine the speed at which one dimensional waves propagate within a process fluid within an essentially rigid conduit. One drawback to such prior art systems is that the strain-based system requires an essentially rigid conduit and would not work on for flexible hydraulic hoses.

The presence of coherent pressure variations due to vortical disturbances within piping networks is well established. For an array of sensors measuring pressure variations over an aperture length for which the vortical disturbances remain coherent, the vortical disturbances would serve to confound any systems attempting to measure the process fluid sound speed using similar frequency ranges. Vortical disturbances within conduits typically have a coherence length on the order of 10 times the diameter of the conduit. Vortical disturbances typically have frequencies on the order of 1 to 10 times or higher times the ratio of the mean velocity divided by the diameter. Depending on the diameter and flow rates and the acoustic environment, vortical disturbances can often be the largest source of low frequency unsteady pressure variations within a conduit, often exceeding acoustic pressure variations. By utilizing arrays with sensor spacing that is long compared to 10 times the diameter of the conduit, embodiments of the current disclosure can utilize low frequency acoustics without picking up coherent vortical disturbances that are often present at low frequencies.

Depending on the signals sought, the signal to noise ratio, and other considerations, SONAR arrays of the prior art towed behind vessels can have >1000 sensors in a linear array with an aperture of >1000 metes https://en.wikipedia.org/wiki/Towed_array_sonar. The large number of sensors in often driven by the number, type, and prevalence of multiple coherent signals picked-up by the array. The approach disclosed herein leverages advantages of including a hydraulic hose within the aperture of the array to improve signal to noise and enable effects determination of a process fluid sound speed utilizing only two sensors.

It is known that process fluids within piping networks include, among other things, coherent acoustic waves, coherent vortical structures, and coherent propagating structural disturbances. Implementations described in this disclosure are particularly well-suited to minimize any effects of coherent vortical structures and coherent propagating structural disturbances on its ability to effectively determine the process fluid sound speed with a hydraulic system. Namely, although the hydraulic hoses are flexible lengthwise, hydraulic hoses are effective at transmitting acoustic pressure pulsations and not very effective at transmitting other types of competing coherent signals. Therefore it is an aspect of the present disclosure that the flexible hydraulic hose within the piping network is configured to preferentially, with respect to the coherent acoustic waves, reduce the coherence between the signals measured by a pair of acoustic pressure sensors associated with the coherent vortical structures, and coherent propagating structural disturbances.

It should be appreciated by those skilled in the art that Wood's equation can be used to analyze the effect of a change in the acoustic compliance of a conduit on the speed of sound within that conduit:

$$\frac{1}{\rho_{mix} a_{mix}^2} = \sum_{i=1}^{N} \frac{\varphi_i}{\rho_i a_i^2} + \frac{D-t}{Et} \quad \text{(Equation 23)}$$

The acoustic compliance of a conduit can be defined as the change in cross sectional area (normalized by the nominal cross sectional area) per change in acoustic pressure. For a circular duct of constant thickness, diameter, and modulus of elasticity, the acoustic compliance can be expressed as:

$$\sigma_{conduit} \equiv \frac{D-t}{Et} \quad \text{(Equation 24)}$$

Where D is the diameter of the conduit, t is the wall thickness of the conduit and E is modulus of elasticity of the conduit.

And the compliance of the fluid mixture within the conduit can be expressed as:

$$\sigma_{mix} \equiv \frac{1}{\rho_{mix} a_{mix}^2} \quad \text{(Equation 25)}$$

Where $\rho_{mix}$ is the density of the fluid mixture and $a_{mix}$ is the speed of sound of the fluid mixture.

For the same fluid, the speed of sound change associated with a change in the conduit compliance between two conduits can be approximated as:

$$a_{mix_2} = \frac{a_{mix_1}}{sqrt\left(1 + \rho_{mix} a_{mix_1}^2 \left(\sigma_{conduit_2} - \sigma_{conduit_1}\right)\right)} \quad \text{(Equation 26)}$$

The reflection coefficient for a one dimensional acoustic wave incident upon a change in the compliance of the conduit can be expressed, as:

$$R \equiv \frac{a_{mix_2} - a_{mix_1}}{a_{mix_2} + a_{mix_1}} \quad \text{(Equation 27)}$$

Where, assuming the compliance of the pipe is small compared to the compliance of the mixture, $$\frac{\sigma_{conduit_2}}{\sigma_{mix}} \ll 1 \quad \text{(Equation 28)}$$
$$\frac{\sigma_{conduit_1}}{\sigma_{mix}} \ll 1$$

The reflection coefficient can be written as:

$$R \equiv -\frac{1}{4}\left(\frac{\sigma_{conduit_2} - \sigma_{conduit_1}}{\sigma_{mix}}\right) \quad \text{(Equation 29)}$$

For low pressure process fluids such as fluid in the return line of hydraulic system, even small amounts of entrained gas result in large mixture compliances, and therefore, in most cases, relatively small reflection coefficients are found at the transition from a relatively rigid conduit into a hydraulic hose for fluid with non-zero amounts of entrained gas For example, assuming a pressure of 100 psi, the reflection coefficient associated with an one-dimensional acoustic wave propagating in steel conduit of 1 inch diameter and 0.2 inches thick and elastic modulus of 30 million psi, encountering a change in conduit compliance associated with a PVC pipe of the same dimensions but with a modulus of $\frac{1}{100}^{th}$ that of steel, the reflection coefficient associated with change in the compliance of the conduit would be R<0.2 for a typical hydraulic fluid with >0.05% entrained air by volume. For larger amount of entrained air by volume, or for lower pressures, the reflection coefficient would be lower. For smaller amount of entrained air by volume, or for higher pressures, the reflection coefficient would be larger.

Figure 8:
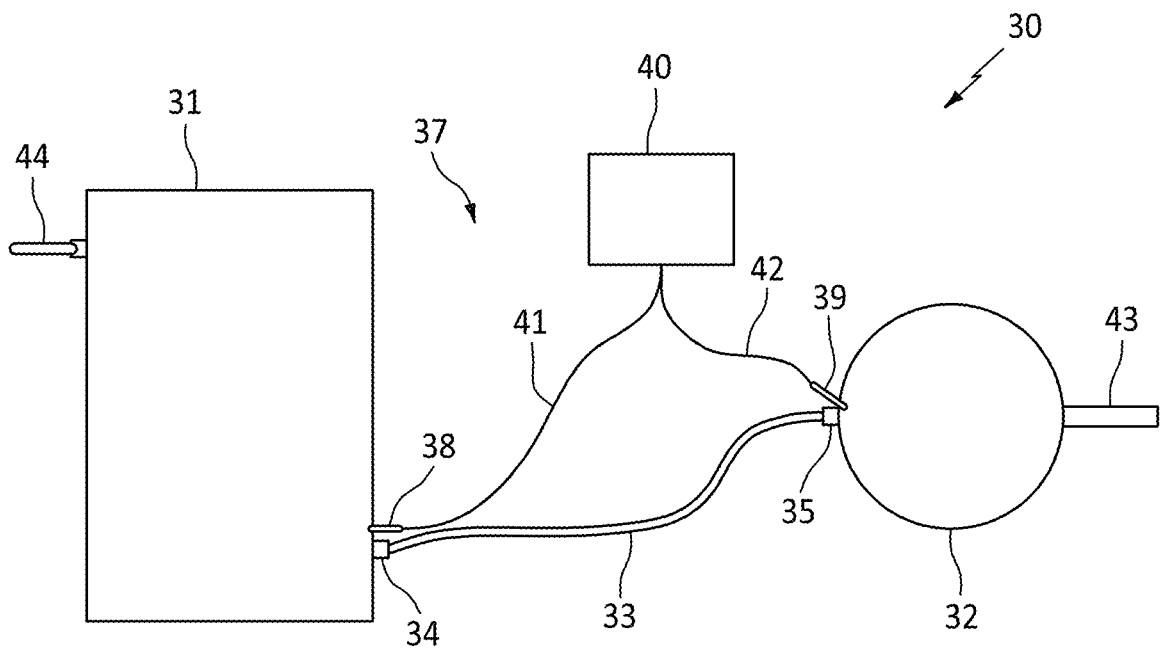
FIG. 8 is a schematic representation of a hydraulic monitoring system in accordance with the present disclosure.

Thus, although reflections of one dimensional acoustics will, in general, occur in aerated and non-aerated hydraulic fluids at the transition from rigid conduits (with low acoustic compliances) to flexible hydraulic hoses (with higher acoustic compliances) due primarily to changes in cross section area and changes in gas void fraction due to pressure drop, and to a lesser extend due to changes in the compliance of the conduit, the current disclosure teaches that acoustics are typically sufficiently well-transmitted though changes in the characteristic volumetric impedance associated with transitions into and out of flexible hydraulic hoses to make determine at the process fluid sound speed. Moreover, there are specific aspects of the current invention that promote the ability to utilize a low number of pressure sensors to enable a determination of the process fluid sound speed. These include 1) the length-wise bending flexibility and length-wise torsional compliance of hydraulic hoses effectively prevents hydraulic hoses from effectively transmitting structural vibrations from one end of the hose to the other end of the hose. As such, hydraulic hoses serve as effective vibration isolators within a piping network. Specifically, by mounting the transducers on a piping network that spans a section of flexible hose, this implementation of the current disclosure effectively filters out coherent structural vibrations from one sensor to the other. 2) Additionally, hydraulic hoses within hydraulic systems typically have length to diameter ratios of >10. The coherence of vortical disturbances in a process fluid flowing within a conduit decreases with length. Thus, for applications in which the length to diameter ratio of hose contained within the acoustic aperture of a sensor array is long, for example greater than 10, the likelihood of vortical disturbances significantly impairing the interpretation of the process fluid sound speed is quite low, and decreases further with flexible hydraulic hoses that have larger length to diameter ratios; and 3) In further addition, long length hoses promote the ability of determining the process fluid sound speed because long aperture enable the use of typically higher amplitude, better signal to noise conditions, or low frequency waves compared to prior art methods that typical utilized much shorter array apertures. the long length of hydraulic hoses An implementation of a fluid measuring system of the current disclosure can be seen with reference to hydraulic system 30 of FIG. 8. FIG. 8 is a schematic drawing of hydraulic system 30 comprised of reservoir 31 coupled to pump 32 by hydraulic hose 33. of an embodiment of the invention. Hydraulic hose 33 has a constant cross-sectional area along its hose length and includes reservoir coupling 34 positioned on a first end portion to attach to the liquid outlet of reservoir 31 and pump coupling 35 positioned on a second end portion to attach to the suction side of pump 32. Hydraulic system 30 further includes fluid monitoring system 37 comprised a first acoustic pressure sensor 38, a second acoustic pressure sensor 39 and a processing unit 40. First acoustic pressure sensor 38 is electrically coupled to processing unit 40 by wire 41 and second acoustic pressure sensor 39 is electrically coupled to processing unit 40 by wire 42. As shown, first acoustic pressure sensor 38 is installed in oil reservoir 31 in close proximity to the liquid outlet and configured to sense the acoustic pressures in reservoir near fitting 34. It should be appreciated by those skilled in the art that acoustic pressure sensor 38 could also be installed on reservoir coupling 34. Second acoustic pressure sensor 39 is installed on the suction side of pump 32 but could be installed in pump coupling 35. Hydraulic hose 33 could include a filter (not shown) or the filter, if present, could be considered another component of hydraulic system 30, and a pressure transducer could be installed in or near the filter. The acoustic pressure transducers 38, 39 are each electrically connected to a processing unit 40 which utilizes passively listening and beam forming techniques to measure the process fluid sound speed within hydraulic hose 33 even though the acoustic pressure sensors are not mounted on the hose. Processing unit 40 is further configured to determine a gas void fraction of the hydraulic fluid representative of the entrained air content. It should be appreciated by those skilled in the art that, given the current disclosure, that the two sensor array comprised of first acoustic pressure sensor 38 and second acoustic pressure sensor 39 are positioned close to changes in the characteristic volumetric impedance of the piping network wherein those changes produce significant acoustic reflections.

For acoustics propagating within ducts for which the mean fluid properties are essentially constant, the characteristic volumetric impedance is a function of the cross sectional area of the duct. As disclosed above, changes in the characteristic volumetric impedance result in reflections of propagating acoustics wave within a duct. Reflections of incident acoustic waves occur for incident acoustic waves from either direction within a piping network. It should therefore be appreciated by those skilled in the art that for a piping network with one or more regions for which acoustics reflections are generated, the resulting acoustic field can be significantly different from the acoustic field that would have been present without any reflections.

Referring next to FIG. 9, there is shown a schematic of piping network 45 including fluid monitoring system 51. Piping network 45 is comprised of an inlet pipe 46 coupled to a flexible hydraulic hose 48 by inlet coupling 47 and outlet pipe 50 coupled to the flexible hose by outlet coupling 49. Fluid monitoring system 51 comprises a first acoustic pressure sensor 52, a second acoustic pressure sensor 54 and a processing unit 53. First acoustic pressure sensor 52 is electrically coupled to processing unit 53 by wire 55 and second acoustic pressure sensor 54 is electrically coupled to processing unit 53 by wire 56. First acoustic pressure sensor 52 is positioned within a portion of outlet coupling 49 and is configured to be acoustically coupled to hydraulic oil within the coupling. Second acoustic pressure sensor 52 is positioned within a portion of inlet coupling 47 and is configured to be acoustically coupled to hydraulic oil within the coupling. The pressure transducers are each connected to processing unit 53 which utilizes passively listening and beam forming techniques disclosed herein above to measure the process fluid (hydraulic oil in this example) sound speed within hydraulic hose 48 even though the acoustic pressure sensors are not mounted on the hose. Processing unit 53 is further configured to determine a gas void fraction of the hydraulic fluid. It should be appreciated by those skilled in the art that the two sensor array comprised of first acoustic pressure sensor 52 and second acoustic pressure sensor 54 comprise an instrumented section of hydraulic hose that can have a male and a female quick disconnect fitting on either end of the hose. Such an instrumented section of hydraulic hose can have great utility in monitoring and diagnosing problems in a hydraulic system. As part of the present disclosure, first acoustic pressure sensor 52 and second acoustic pressure sensor 54 are positioned within, or in close proximity to, couplings 49 and 47 respectively and are installed in fluid communication with the process fluid (hydraulic oil) within the section of hydraulic hose 48 wherein physical changes disclosed herein above produce significant acoustic reflections. The pressure transducers, acoustic pressure sensors 52, 54, are each connected to processing unit 53 by respective wires 55, 56 wherein the processing unit utilizes passively listening and beam forming techniques disclosed herein above to measure the process fluid sound speed within the hydraulic hose 48. Processing unit 53 is further configured to determine a gas void fraction of the hydraulic fluid within hydraulic hose 48 as well as other parameters related to the hydraulic fluid including water entrainment and contaminants.

It should be noted that the instrumented hydraulic system is comprised of hydraulic hose 48, inlet coupling portion 47 including acoustic pressure sensor 54 and outlet coupling portion 49 including acoustic pressure sensor 52 pipe can be inserted anywhere within a hydraulic system where there is a quick disconnect fitting of the same type. For example, if there is a quick disconnect at the inlet of a hydraulic pump (32 in FIG. 8), the quick disconnect could be disconnected, and the instrumented section of hydraulic hose could be inserted to measure the process fluid speed and interpret a gas void fraction within the piping network that includes the hydraulic pump. It should be further noted that this particular implementation has additional advantages over prior art in that a flexible hydraulic hose effectively minimizes any coherence of structural disturbances across the aperture that could be present on a more rigid conduit. Additionally, for systems in which the length to diameter ratio of the conduit separating the two sensors is large (>10 as disclosed herein above and below), there will be little coherence of vortical disturbances to confound the two sensor beamforming of the present disclosure.

It should be appreciated by those skilled in the art that utilizing an array with an aperture that contains acoustic reflections produced by connectors (as well as other changes in characteristic volumetric impedance) can pose a significant challenge to determining the process fluid sound speed by interpreting the output of the array of acoustic sensors for several reasons.

Firstly, as disclosed herein above, and ideally, a conduit, or piping network within the array would have a constant characteristic volumetric impedance and constant elasticity of the conduit, such that any acoustics reflections within the array would be minimized. Beam forming techniques are best suited for determining the propagation characteristics of a propagating wave when waves propagate in both directions within the aperture unimpeded.

Secondly, the acoustic aperture of a one dimensional array is the length of the array along the direction of sound propagation between the two acoustic pressure sensors. Typically, the longer the aperture, the better the system is able to utilize the typically higher amplitude, lower frequency, long wave length naturally occurring sound within the piping network determine the process fluid sound speed.

Therefore, for many hydraulic networks, the flexible hydraulic hoses offer the best opportunity for unimpeded sound propagation over a long aperture and techniques of the prior art would dictate positioning sensors on the conduit within which the speed of sound sought, i.e. in this case on the comparatively long section of hydraulic hose which comprises the majority of the aperture of the array. It is, however, difficult the install acoustic pressure sensors on a hydraulic hose. Typically, pressure transducers require some type of rigid conduit connector for installation. Rigid conduit connectors often contain cross sectional area changes that produce acoustic reflections, due to area changes and pressure changes and gas void fraction changes as discussed above. These acoustic reflections, if they occur within the aperture of an array of pressure sensors attempting to determine the speed of sound of a process fluid within a conduit, will in general serve to confound the array processing as disclosed herein above.

Figure 10:
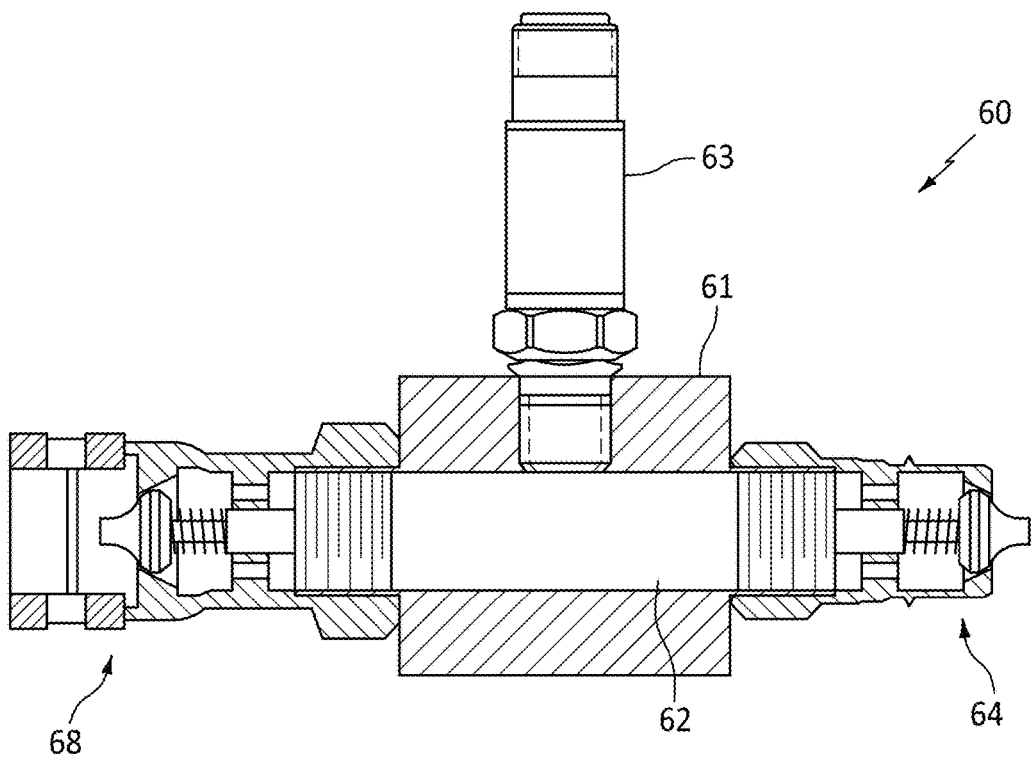
FIG. 10 is a side cross sectional view of a sensor manifold of a hydraulic monitoring system in accordance with the present disclosure.

Referring next to FIG. 10, there is shown a cross sectional rendering of a sensor manifold 60. Sensor manifold 60 is comprised of manifold block 61 including a conduit 62 running therethrough and slightly beyond the block with male pipe threads positioned on the outer surface. Manifold block 61 further includes a female thread extending from an outer surface and into conduit 62 within which acoustic pressure sensor 63 is threadably engaged and is configured to position the acoustic pressure sensor in fluid communication with a hydraulic fluid with the conduit 62. Acoustic pressure sensor 63 can comprise any pressure sensor configured to sense acoustic waves propagating in the hydraulic fluid and in some implementations can comprise a piezo electric crystal pressure transducer. Manifold block 61 also includes a first coupling section 64 threadably engaged onto a first threaded end of conduit 62 and a second coupling section 65 threadably engaged onto a second threaded end of conduit 62. In this particular implementation, first coupling section 64 comprising a male quick disconnect coupling section portion and second coupling section 65 comprises a female quick disconnect coupling section. It should be noted that although the manifold block 60 could be implemented with any type of connector, it would also benefit from quick disconnects 64, 65. Manifold block 60 is particularly useful for applications in which two components are connected with a hydraulic hose that has quick disconnects on both ends. For example, a hose with two male disconnects. This implementation teaches to construct two short conduits sections, each with a male and a female disconnect and a pressure transducer installed on each of the two short conduits. Conduit 62 of manifold block 60 can be inserted in between a first hydraulic component, say reservoir 31 (FIG. 8) and the one end of hydraulic hose 33, and a second hydraulic component, say pump 32, and the other end of the hydraulic hose. As disclosed, inserting a pair of manifold blocks 60 with acoustic pressure sensors 63 provides a means to instrument the process fluid within the hydraulic line to provide a process fluid sound speed measurement and from that determine entrained air levels and other parameters of the fluid.

Another embodiment of fittings or manifolds of the current disclosure includes utilizing bleed rings to provide pressure ports into a hydraulic system. Bleed rings can be inserted between two flanges and captured between the two flanges with gaskets on either side. Such an embodiment includes a bleed ring with an ⅛" NPT acoustic pressure transducer captured between a pair of 1 inch. 150 lb. flanges.

Figure 11:
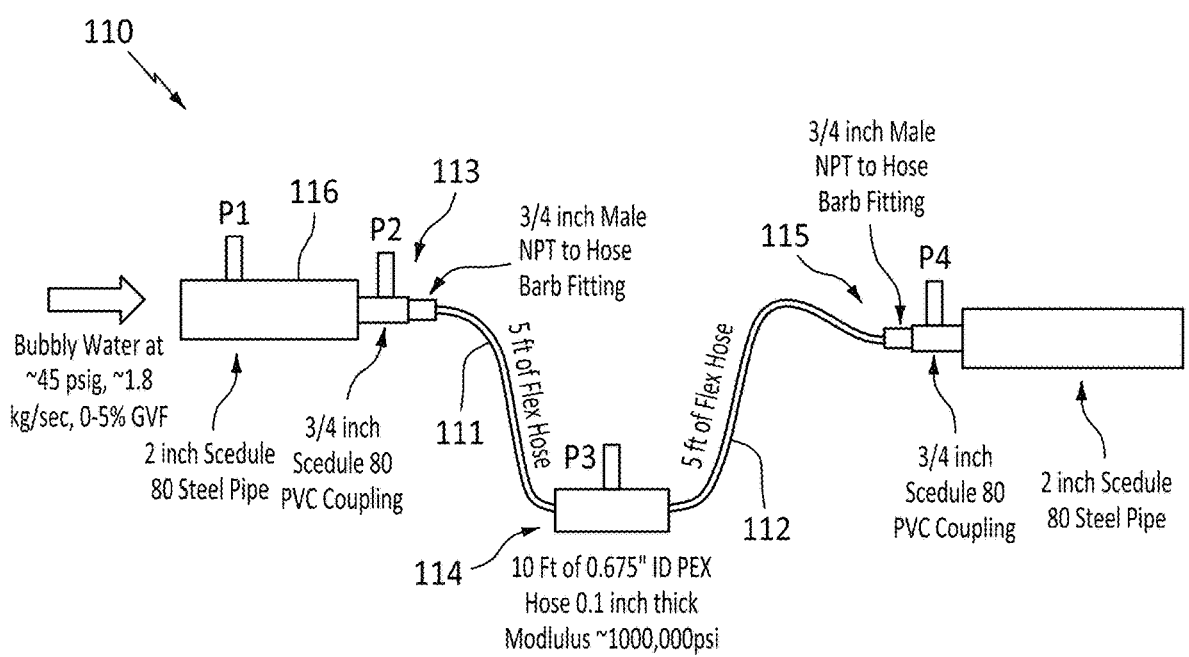
FIG. 11 is a schematic representation of a hydraulic monitoring system in accordance with the present disclosure.

Referring to FIG. 11, there is shown an implementation of a fluid monitoring system 110 in accordance with the current disclosure. Similar to the implementations disclosed herein above with specific reference to FIG. 9, fluid monitoring system 110 is comprised 2 flexible hose sections 111, 112 coupled together by 3 couplings 113, 114, 115 each having an acoustic pressure sensor for $P_2$, $P_3$ and $P_4$ acoustic pressure sensors and inlet pipe 116 having $P_1$, positioned therein. The two flexible hose sections 111, 112 can comprise a flexible hydraulic hose. The $P_1$, $P_2$, $P_3$ and $P_4$ sensors are electrically connected to a processor configured to output a speed of sound for a fluid flowing in the plurality of flexible hoses 111, 112 using techniques disclosed herein above. It should be appreciated by those skilled in the art that each of the pairs of acoustic pressure sensors form an acoustic aperture of an array and that the various acoustic pressure sensors comprise a number of arrays and can further comprise an array having $P_1$ through $P_4$ sensors with the acoustic aperture length equaling the length between $P_1$ sensor and $P_4$ sensor.

It should be appreciated by those skilled in the art that the 4 pressure sensors $P_1$ through $P_4$ comprise an acoustic array, in which any subset of the 4 pressure transducers containing 2 or more of the 4 pressure transducers also constitute acoustic arrays.

Figure 12:
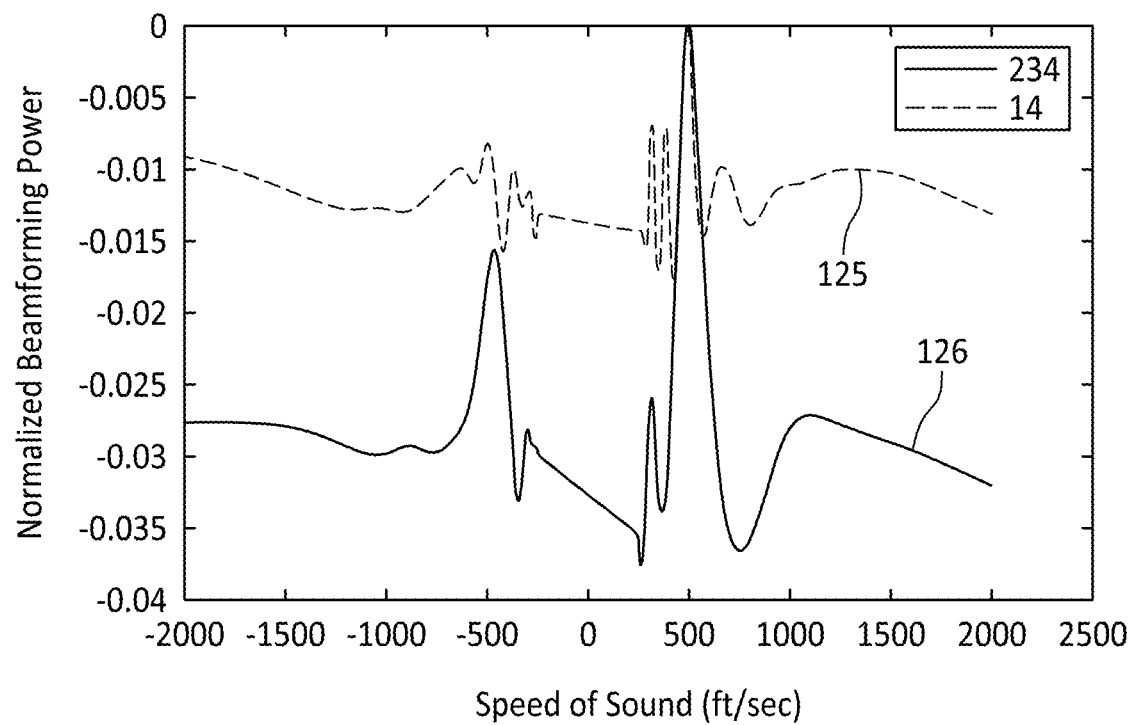
FIG. 12 a graphical representation of the normalized beam forming power versus the speed of sound for water with a gas volume fraction in accordance with the present disclosure.

A test was conducted to evaluate ability of the system shown schematically in FIG. 11 to measure the gas void fraction of bubbly liquids. In operation, water was run through the gas void fraction monitoring system 110 at a pressure of approximately 45 psig at a rate of about 1.8 kg/sec with varying rates of gas void fractions of air from 0-5%. Referring next to FIG. 12, there is shown a graphical representation of the normalized beam forming power versus the speed of sound for water with a gas volume fraction of about 1% as determined by fluid monitoring system 110 for two acoustic arrays, one array containing pressure sensors P1 and P4, denoted as array 14 line 125, and the other array containing pressure sensors P2, P3, and P4, denoted as array 234 line 126. As shown, the normalized beam forming power plot versus sound speed indicated the sound speed with the maximum power occurs at a sound speed of 490 ft/sec for each of the array configurations evaluated. Also as shown, the normalized beam forming power plot versus sound speed from array 234 exhibits a more pronounced than that associated with array 14.

Figure 13:
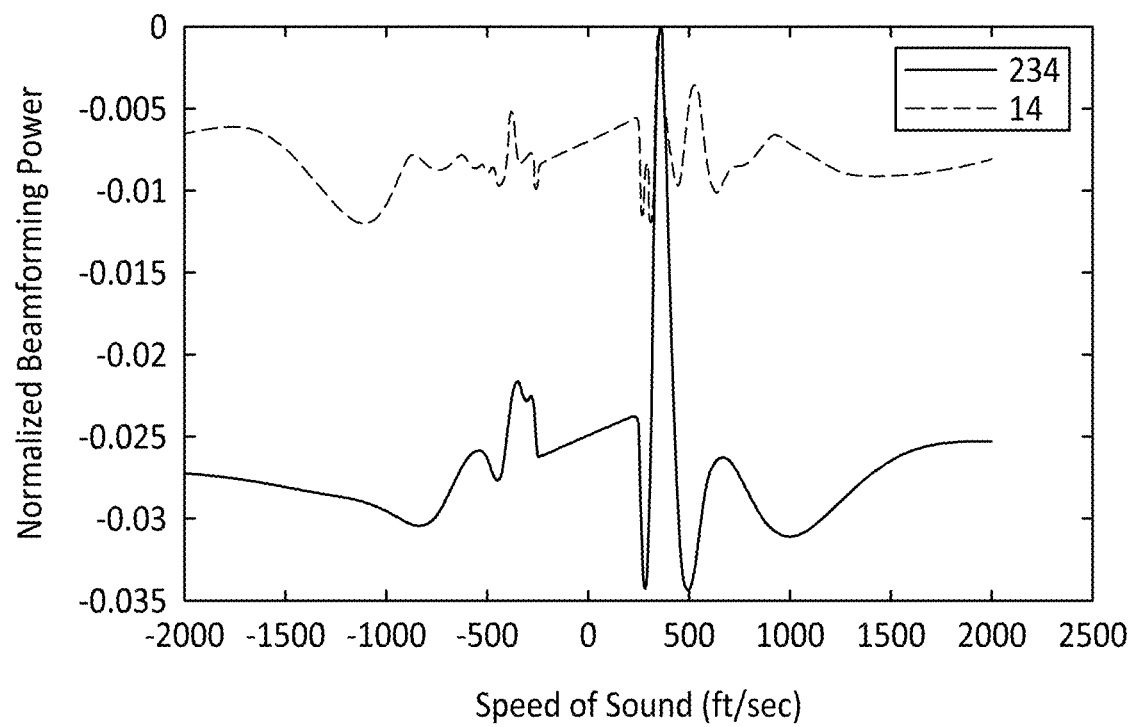
FIG. 13 a graphical representation of the normalized beam forming power versus the speed of sound for water with a gas volume fraction in accordance with the present disclosure.

Similarly, and with reference now to FIG. 13, there is shown a graphical representation of the normalized beam forming power versus the speed of sound for water with a gas volume fraction of about 2.5% as determined by fluid monitoring system 110 for the same two acoustic arrays for which the normalized beam forming power is displayed in FIG. 12

As shown, the normalized beam forming power plot versus sound speed indicated the sound speed with the maximum power occurs at a sound speed of 350 ft/sec for each of the array configurations evaluated. Also as shown, the normalized beam forming power plot versus sound speed from array 234 exhibits a more pronounced than that associated with array 14.

It should be appreciated by those skilled in the art specific position acoustic pressure used in the beam forming analysis were selected as representative of positions to illustrate the utility of the invention and could be vary without departing from the current disclosure.

Figure 14:
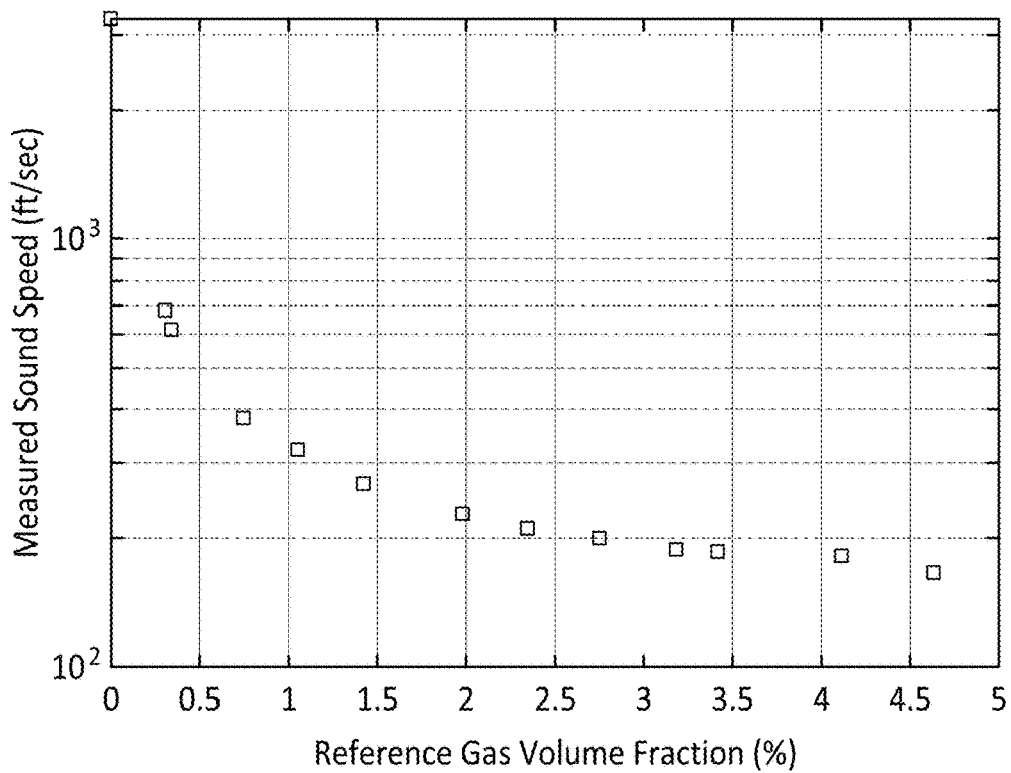
FIG. 14 is a graphical representation of the measured sound speed versus the reference gas volume fraction in accordance with the present disclosure.
Figure 15:
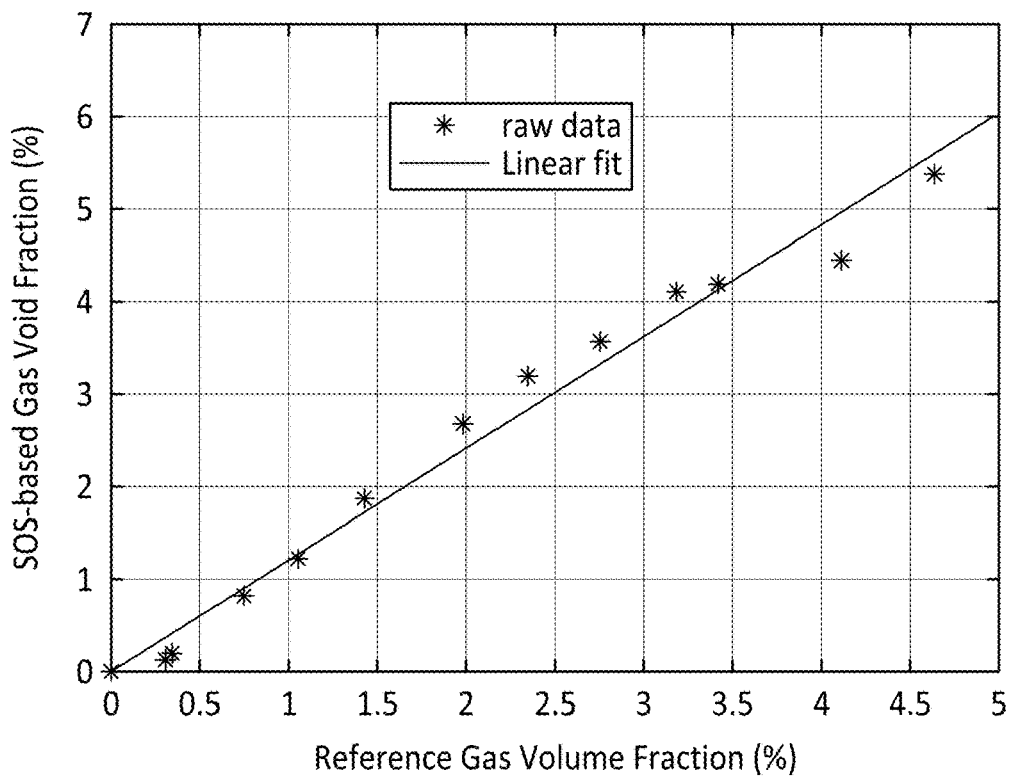
FIG. 15 is a graphical representation of the gas void fraction versus a reference gas void fraction in accordance with the present disclosure.

Now with reference to FIG. 14, there is shown a graphical representation of the measured sound speed versus the reference gas volume fraction as determined by fluid monitoring system 110 and the normalized beam forming power techniques of FIGS. 12 and 13. Referring now to FIG. 15, there is shown a graphical representation of the gas void fraction as determined by fluid monitoring system 110 versus a reference gas void fraction plotted against a linear fit line. It can be seen that fluid monitoring system 110 provides a determination of the gas void fraction for a bubbly fluid flowing through a flexible hose that is highly correlated and linear with respect to the reference injected gas volume fraction. The reference injected gas void fraction was determined utilizing measurements of the single phase air and water rates upstream of the injection point and upstream of the test section. Note that some level of departure between any measured gas void fraction and the reference gas volume fraction is expected due to a several sources of uncertainty including the some amount of the injected air dissolving into the undersaturated water, slippage between the air and water phases causing some level of either gas or liquid hold up, uncertainty in the polytropic exponent of the sound propagation within the bubbly mixtures, and the use of estimates of the average pressure within the test section when the actual pressure within the test section decreases due to pressure low due to flow.

Figure 16:
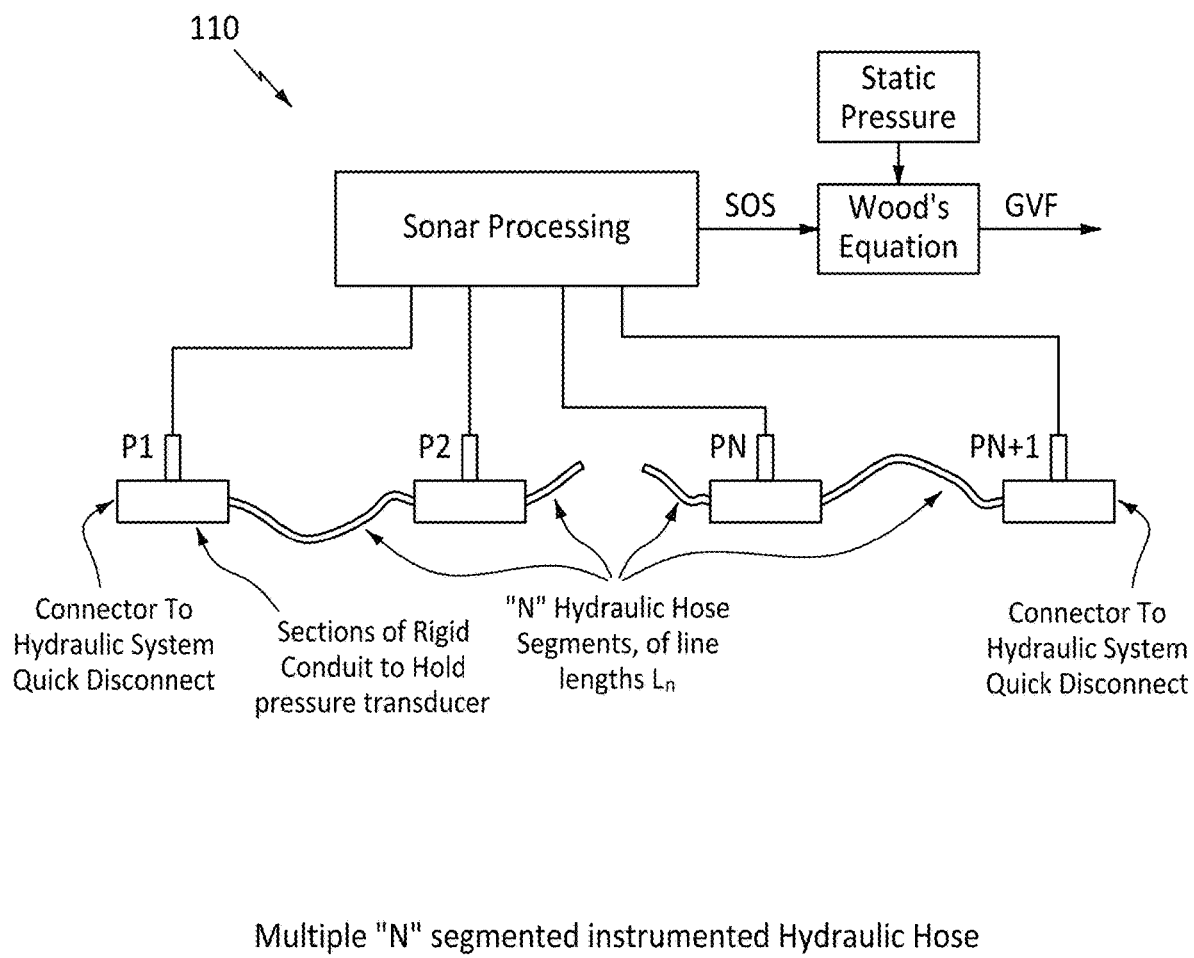
FIG. 16 is a schematic representation of a hydraulic monitoring system in accordance with the present disclosure.

Referring to FIG. 16, there is shown another implementation of a the a gas void fraction monitoring system 160 in accordance with the current disclosure. Similar to the implementations disclosed herein above, fluid monitoring system 160 is comprised a plurality of N flexible hose sections coupled together by N+1 couplings each having an acoustic pressure sensor for $P_1$-$P_{N+1}$ sensors. The N flexible hose sections can comprise a flexible hydraulic hose. The $P_1$-$P_{N+1}$ sensors are electrically connected to a processor configured to output a speed of sound for a fluid flowing in the plurality of flexible hoses using techniques disclosed herein above. Also shown is a processor for determining the gas void fraction of the fluid using Wood's equation and a static pressure signal of the static pressure of the fluid in the plurality of flexible hoses. It should be appreciated by those skilled in the art that each of the pairs of acoustic pressure sensors form an aperture of an array and that the various acoustic pressure sensors comprise a number of arrays and can further comprise an array having $P_{N+1}$ sensors with the acoustic aperture length equaling the length between $P_1$ sensor and $P_{N+1}$ Sensor.

Figure 17:
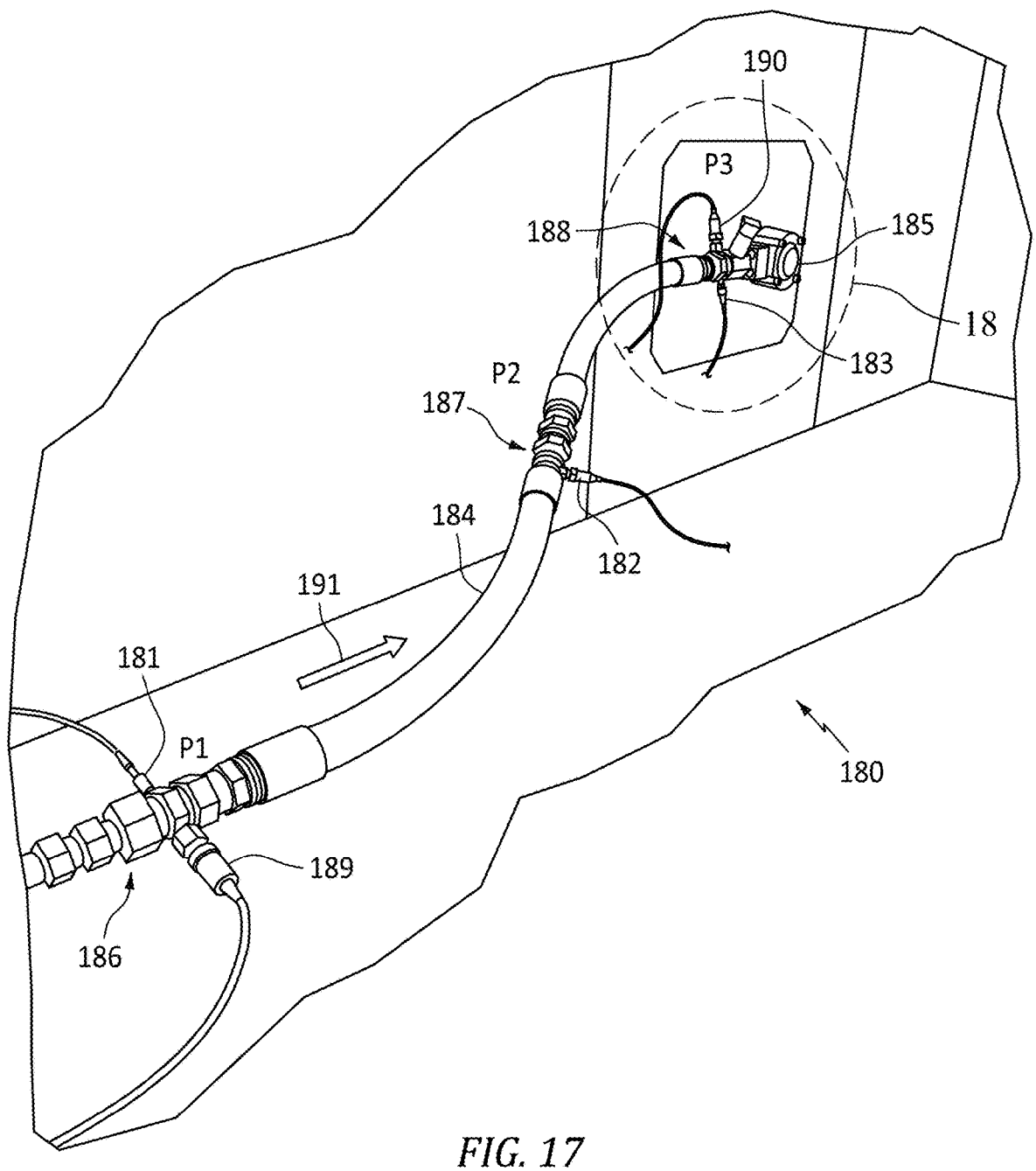
FIG. 17 is a schematic representation of a hydraulic monitoring system in accordance with the present disclosure.
Figure 18:
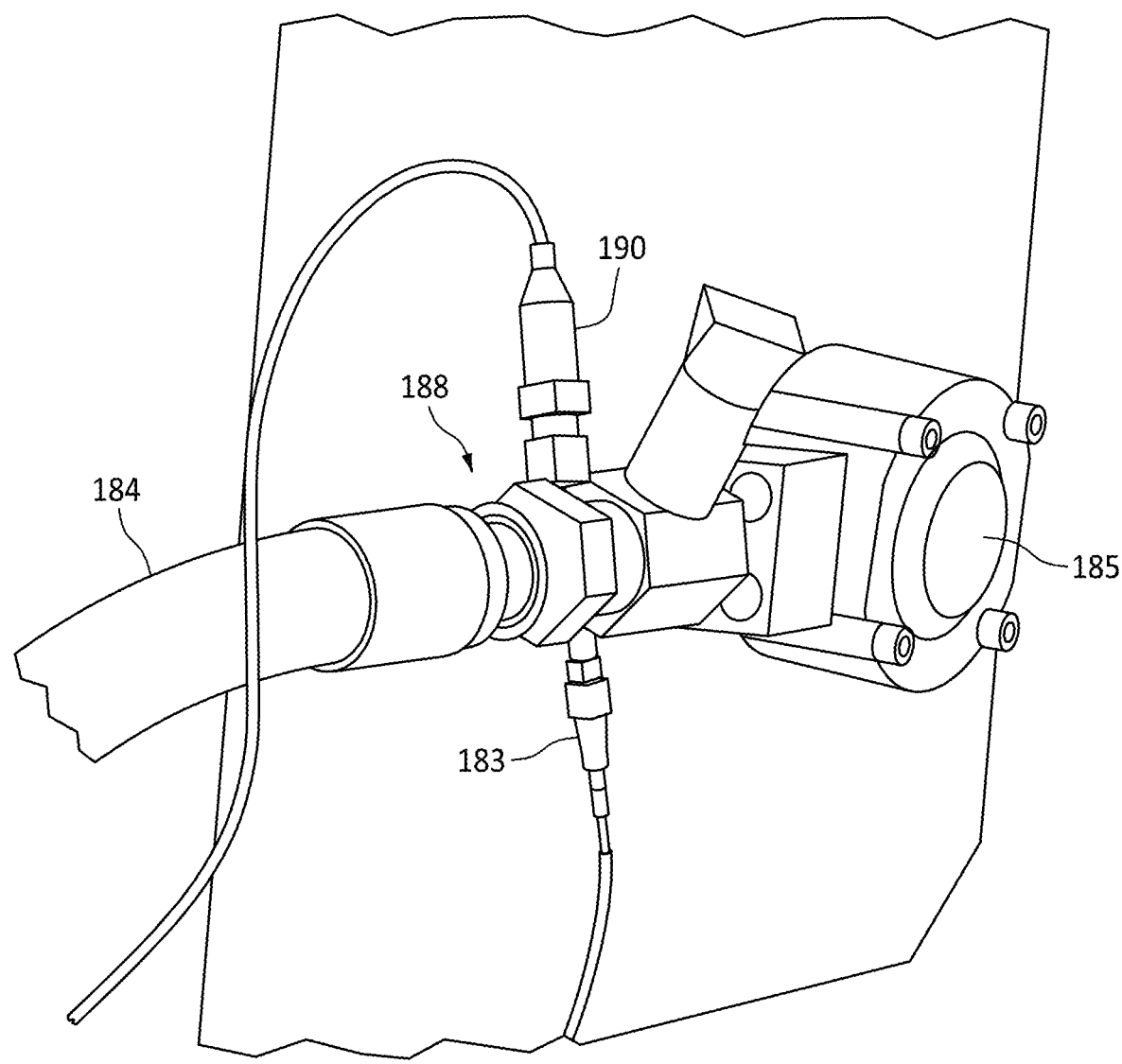
FIG. 18 is a schematic representation of the detail of inset 18 of FIG. 17 of a portion of a hydraulic monitoring system in accordance with the present disclosure.

Now with reference to FIGS. 17, 18, wherein FIG. 18 comprises the detail of inset 18 of FIG. 17, there is shown another embodiment of fluid monitoring system 180 in accordance with the present disclosure. Fluid monitoring system 180 can comprise a gas void fraction monitoring system for continuously or semi-continuously monitoring a gas void fraction of the hydraulic fluid flowing through a hydraulic network. Fluid monitoring system 180 comprises an array of three acoustic pressure sensors, 181, 182, 183. Acoustic pressure sensors, 181, 182, 183 are positioned along the length of hydraulic hose 184 positioned between a hydraulic reservoir (not shown) and an inlet of a hydraulic pump 185 on a fluid power test bed. Acoustic pressure sensors, 181, 182, 183 are mounted within manifold blocks 186, 187, 188 respectively in fluid communication with the hydraulic fluid. Manifold blocks 186, 187, 188 are standard JIC fittings that are connected to standard hydraulic hose 184 with a pressure rating on 4000 psi. Using the coordinate convention disclosed herein above, the first acoustic pressure sensor 181 is located at location 1 at X=0, the second acoustic pressure sensor 182 is positioned at location 2 at X=28 inches, and the third acoustic pressure sensor 183 is positioned at location 3 at X=56 inches. In additional to the three acoustic pressure sensors 181, 182, 183, static pressure sensors 189, 190 are installed at locations 1 and 3 in manifold block 186 and manifold block 188 respectively. For the purposes of the testing, the static pressures measured at locations 1 and 3 were averaged to estimate the pressure of the hydraulic fluid within the array.

Testing was conducted with fluid monitoring system 180 to evaluate the ability of the system to measure the gas void fraction in the hydraulic fluid flowing in the direction of arrow 191 within hydraulic hose 184. As part of one test, a throttle valve (not shown) was partially closed upstream of location 1. The pressure upstream of the restriction was near ambient pressure. As the inlet of the pump 185 pulled the hydraulic fluid through the restriction introduced by the throttle valve, the pressure in the test section was reduced below ambient, releasing dissolved gases in the hydraulic fluid.

Figure 19:
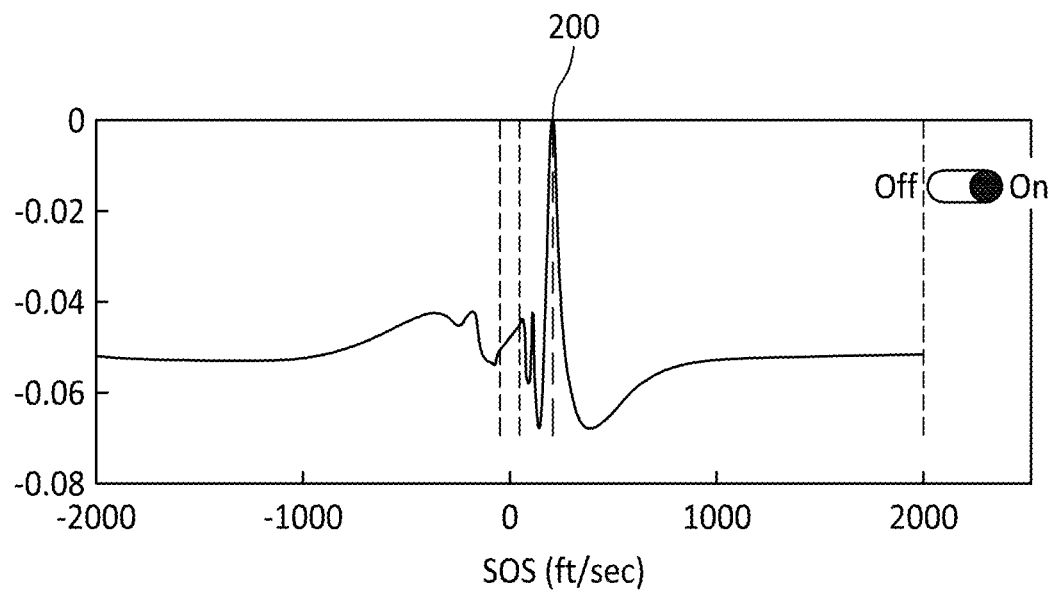
FIG. 19 is a graphical representation the power function as a function of trial sound speed for an array of sensors in accordance with the present disclosure.
Figure 20:
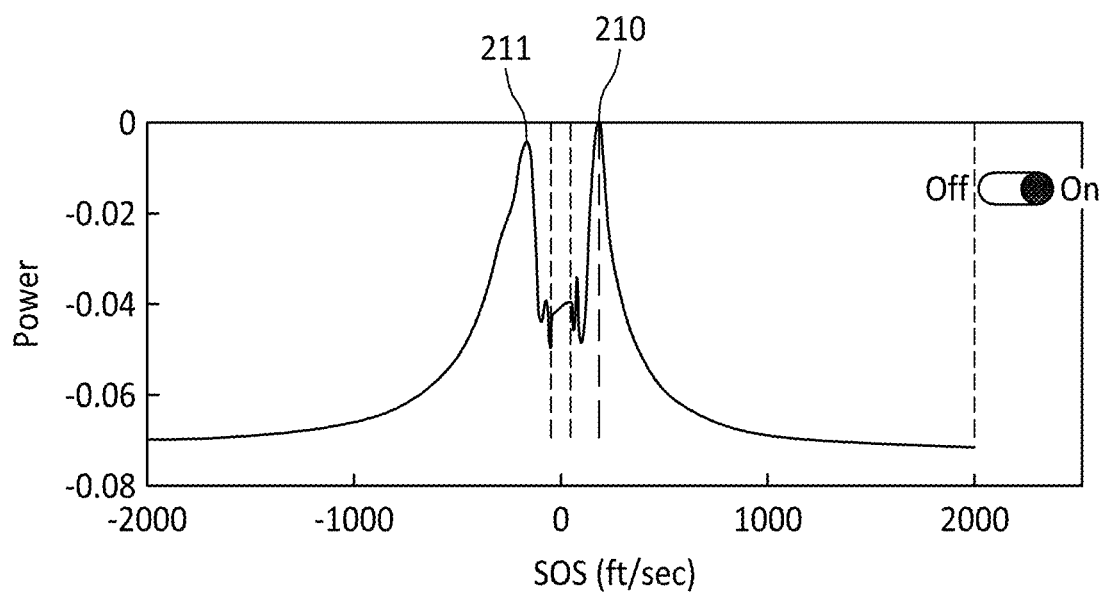
FIG. 20 is a graphical representation the power function as a function of trial sound speed for an array of sensors in accordance with the present disclosure.

Referring now to FIGS. 19, 20, there is shown graphical examples of some of the results of the test disclosed herein above. FIG. 19 shows the normalized beam forming power function as a function of trial sound speed for an array consisting of sensors 181 and 182. At this condition, the average static pressure in the array was measured to be −8.5 psig, (~6.2 psia) and the sound speed determined from the acoustic aperture comprising the array of sensors 181 and 182 was 198 ft/sec at peak 200, corresponding to a gas void fraction of 1.3%. As shown, the power function provides a clear and unambiguous indication of the sound speed of the process fluid within the acoustic aperture of the array. The prominence of the peak 200 at a positive sound speed of 198 ft/sec indicates that most of the noise in propagating in the direction of the flow 191.

FIG. 20 shows the power function at the same operation set point of the hydraulic test bed, but for an array consisting of acoustic pressure sensors, 181, 182, 183. For this array, the measured sound speed at this same nominal set point is 173 ft/sec at peak 210 in the direction of flow 191, corresponding to a gas void fraction of 1.7%. The power function for the 3 sensor array indicates a sound field in which the sound field is more balanced, with sound propagating with comparable intensity both in the direction of flow 191 associated with peak 210 and against the direction of the flow associated with peak 211. This difference may likely be due to the proximity of the pump 185 to the end of the three sensor array with the pump generating noise that propagates within the hydraulic hose 184 entering through manifold block 188.

Differences between the sound speed measured from the two arrays at the same operating conditions can, at least in part, be attributed to the gas void fraction changing within the array due to pressure losses due to friction. The static pressure in the array is highest at sensor 189, and decreases through the array, toward the inlet of the pump. It should also be appreciated that the static pressure utilized to determine the gas void fraction using Wood's Equation is based on the measured sound speed from each configuration and was assumed to be the same, although in reality, the average static pressure within the array consisting of acoustic pressure sensors 181 and 182 is higher than the average pressure in the array consisting of acoustic pressure sensors 181, 182 and 183 due to the static pressure loss described above. The description of the test above and the data presented provides an example of the utility and flexibility of the fluid monitoring system of this disclosure.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context. As used herein, the terms acoustic pressure sensor, acoustic transducer and transducer are used to mean the same element and include a device configured to measure the unsteady pressure of a fluid are different and distinguished form devices configured to measure steady (or DC) pressures a fluid. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A fluid measuring system comprising:
    a piping network comprising;
        a flexible hydraulic hose comprising:
            a hose length;
            a hose diameter
            a first end portion and a second end portion; and
            a first fitting coupled to the first end portion and a second fitting coupled to the second end portion;
        an acoustic array comprising:
            a first acoustic pressure sensor positioned proximate the first fitting;
            a second acoustic pressure sensor positioned proximate the second fitting; and
            an acoustic aperture that spans an aperture length between the first acoustic pressure sensor and the second acoustic pressure sensor; and
    a processing unit that determines a speed of sound of a process fluid within the piping network and within acoustic aperture using the first acoustic pressure sensor and the second acoustic pressure sensor.

2. The fluid measuring system of claim 1 wherein the first acoustic pressure sensor and the second acoustic pressure sensor are not positioned on the flexible hydraulic hose.

3. The fluid measuring system of claim 1 wherein the first fitting and the second fitting produce at least one change in a characteristic volumetric impedance within the acoustic aperture wherein the at least one change in a characteristic volumetric impedance is at least 25%.

4. The fluid measuring system of claim 3 wherein the first fitting and the second fitting produce at least one change in a characteristic volumetric impedance within the acoustic aperture.

5. The fluid measuring system of claim 4 further comprising:
    a plurality of reflections of incident acoustic waves produced by the at least one change in a characteristic volumetric impedance in the process fluid within the aperture; and
    the processing unit is configured to determine the speed of sound of the process fluid within the acoustic aperture in the presence of the plurality of reflections of incident acoustic waves.

6. The fluid measuring system of claim 1 wherein at least one of the first fitting and the second fitting comprise at least a portion of a quick disconnect fitting.

7. The fluid measuring system of claim 6 wherein the first fitting comprises at least a portion of a first quick disconnect fitting and the second fitting comprises at least a portion of a second quick disconnect fitting.

8. The fluid measuring system of claim 7 wherein the first acoustic pressure sensor is positioned in the first quick disconnect fitting and the second acoustic pressure sensor is positioned in the second quick disconnect fitting.

9. The fluid measuring system of claim 1 further comprising at least one manifold block coupled to any of the first fitting and the second fitting and wherein any of the first acoustic pressure sensor and the second acoustic pressure sensor is positioned in the at least one manifold block.

10. The fluid measuring system of claim 1 wherein the first acoustic pressure sensor and the second acoustic pressure sensor are configured to be in fluid communication with the process fluid.

11. The fluid measuring system of claim 10 wherein the first acoustic pressure sensor and the second acoustic pressure sensor comprise piezo electric crystal pressure transducers.

12. The fluid measuring system of claim 1 wherein the piping network further comprises any of a reservoir, a pump, an actuator, a manifold, and a filter and wherein at least one of the first fitting and the second fitting is coupled to any of the reservoir, the pump, the actuator, the manifold, and the filter.

13. The fluid measuring system of claim 1 further comprising the processing unit configured to determine an entrained air content of the process fluid using the speed of sound.

14. The fluid measuring system of claim 1 further comprising the processing unit configured to determine a physical property of the process fluid using the speed of sound.

15. The fluid measuring system of claim 1 further comprising the processing unit configured to determine changes in the process fluid using the speed of sound.

16. The fluid measuring system of claim 1 further comprising the processing unit configured to determine a presence of at least one contaminate in the process fluid using the speed of sound.

17. The fluid measuring system of claim 1 further comprising the processing unit configured to determine a diagnostic state of the piping network using the speed of sound.

18. The fluid measuring system of claim 1 wherein the hose length is substantially equal to the acoustic aperture.

19. The fluid measuring system of claim 1 wherein the flexible hydraulic hose is comprised of an elastomer material.

20. The fluid measuring system of claim 19 wherein the flexible hydraulic hose is comprised of a composite having a plurality of materials and wherein the plurality of materials include at least one elastomer material and at least one reinforcing material.

21. The fluid measuring system of claim 1 wherein the flexible hydraulic hose is comprised of an elastomer material having an elastic modulus of less than 1,000,000 psi and an elongation at yield of greater than 5%.

22. The fluid measuring system of claim 1 wherein the aperture length is greater than ten times the hose diameter.

23. The fluid measuring system of claim 1 wherein the piping network includes coherent acoustic waves, coherent vortical structures, and coherent propagating structural disturbances; and wherein the piping network is configured to preferentially reduce the coherence between the signals measured by the first acoustic pressure sensor and the second acoustic pressure sensor associated with the coherent vortical structures, and coherent propagating structural disturbances.

24. A fluid measuring method comprising:
providing a piping network comprising;
a flexible hydraulic hose comprising:
a hose length;
a hose diameter
a first end portion and a second end portion; and
a first fitting coupled to the first end portion and a second fitting coupled to the second end portion;
an acoustic array comprising:
a first acoustic pressure sensor positioned proximate the first fitting;
a second acoustic pressure sensor positioned proximate the second fitting; and
an acoustic aperture that spans an aperture length between the first acoustic pressure sensor and the second acoustic pressure sensor;
providing a processing unit; and
determining, with the processing unit, a speed of sound of a process fluid within the piping network and within acoustic aperture using the first acoustic pressure sensor and the second acoustic pressure sensor.

25. The fluid measuring method of claim 24 further comprising positioning the first acoustic pressure sensor and the second acoustic pressure sensor beyond the first end portion and the second end portion of the flexible hydraulic hose.

26. The fluid measuring method of claim 24 further comprising producing at least one change in a characteristic volumetric impedance within the acoustic aperture wherein the at least one change in a characteristic volumetric impedance is at least 25%.

27. The fluid measuring method of claim 26 further comprising producing at least one change in a characteristic volumetric impedance within the acoustic aperture.

28. The fluid measuring method of claim 27 further comprising:
producing a plurality of reflections of incident acoustic waves using the at least one change in a characteristic volumetric impedance in the process fluid within the aperture; and
determining with the processing unit the speed of sound of the process fluid within the acoustic aperture in the presence of the plurality of reflections of incident acoustic waves.

29. The fluid measuring method of claim 24 wherein at least one of the first fitting and the second fitting comprise at least a portion of a quick disconnect fitting.

30. The fluid measuring method of claim 29 wherein the first fitting comprises at least a portion of a first quick disconnect fitting and the second fitting comprises at least a portion of a second quick disconnect fitting.

31. The fluid measuring method of claim 30 further comprising positioning the first acoustic pressure sensor in the first quick disconnect fitting and positioning the second acoustic pressure sensor in the second quick disconnect fitting.

32. The fluid measuring method of claim 24 further comprising coupling at least one manifold block to any of the first fitting and the second fitting and positioning any of the first acoustic pressure sensor and the second acoustic pressure sensor in the at least one manifold block.

33. The fluid measuring method of claim 24 further comprising positioning the first acoustic pressure sensor and the second acoustic pressure sensor in fluid communication with the process fluid.

34. The fluid measuring method of claim 33 wherein the first acoustic pressure sensor and the second acoustic pressure sensor comprise piezo electric crystal pressure transducers.

35. The fluid measuring method of claim 24 wherein the piping network further comprises any of a reservoir, a pump, an actuator, a manifold, and a filter, the method further comprising coupling at least one of the first fitting and the second fitting to any of the reservoir, the pump, the actuator, the manifold, and the filter.

36. The fluid measuring method of claim 24 further comprising determining, with the processing, an entrained air content of the process fluid using the speed of sound.

37. The fluid measuring method of claim 24 further comprising determining, with the processing unit, a physical property of the process fluid using the speed of sound.

38. The fluid measuring method of claim 24 further comprising the processing unit configured to determine changes in the process fluid using the speed of sound.

39. The fluid measuring method of claim 24 further comprising determining, with the processing unit, a presence of at least one contaminate in the process fluid using the speed of sound.

40. The fluid measuring method of claim 24 further comprising determining, with the processing unit, a diagnostic state of the piping network using the speed of sound.

41. The fluid measuring method of claim 24 wherein the hose length is substantially equal to the acoustic aperture.

42. The fluid measuring method of claim 24 wherein the flexible hydraulic hose is comprised of an elastomer material.

43. The fluid measuring method of claim 42 wherein the flexible hydraulic hose is comprised of a composite having a plurality of materials and wherein the plurality of materials include at least one elastomer material and at least one reinforcing material.

44. The fluid measuring method of claim 24 wherein the flexible hydraulic hose is comprised of an elastomer material having an elastic modulus of less than 1,000,000 psi and an elongation at yield of greater than 5%.

45. The fluid measuring method of claim 24 wherein the aperture length is greater than ten times the hose diameter.

46. The fluid measuring method of claim 24 wherein the piping network includes coherent acoustic waves, coherent vortical structures, and coherent propagating structural disturbances; and the method further comprises reducing the coherence between the signals measured by the first acoustic pressure sensor and the second acoustic pressure sensor associated with the coherent vortical structures, and coherent propagating structural disturbances.

* * * * *